(12) United States Patent
Walker et al.

(10) Patent No.: US 10,927,207 B2
(45) Date of Patent: *Feb. 23, 2021

(54) THERMOPLASTIC VULCANIZATE COMPOSITIONS

(71) Applicant: ExxonMobil Chemical Patents Inc., Baytown, TX (US)

(72) Inventors: Ron Walker, Pearland, TX (US); Sudhin Datta, Houston, TX (US); Andy H. Tsou, Houston, TX (US); Brian J. Rohde, Houston, TX (US); Tamara L. Blanton, Nassau Bay, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/356,951

(22) Filed: Mar. 18, 2019

(65) Prior Publication Data

US 2019/0309153 A1 Oct. 10, 2019

Related U.S. Application Data

(60) Provisional application No. 62/653,734, filed on Apr. 6, 2018.

(51) Int. Cl.

| C08F 236/04 | (2006.01) |
|---|---|
| C08F 210/06 | (2006.01) |
| C08F 210/02 | (2006.01) |
| C08L 23/16 | (2006.01) |
| C08L 23/14 | (2006.01) |
| C08F 236/20 | (2006.01) |
| C08F 210/18 | (2006.01) |
| C08J 3/21 | (2006.01) |
| C08J 3/24 | (2006.01) |

(52) U.S. Cl.
CPC ........ *C08F 236/045* (2013.01); *C08F 210/02* (2013.01); *C08F 210/06* (2013.01); *C08J 3/212* (2013.01); *C08J 3/24* (2013.01); *C08L 23/142* (2013.01); *C08L 23/16* (2013.01); *C08F 210/18* (2013.01); *C08F 236/20* (2013.01); *C08F 2500/03* (2013.01); *C08F 2500/12* (2013.01); *C08F 2500/17* (2013.01); *C08F 2500/21* (2013.01); *C08F 2500/24* (2013.01); *C08L 2205/025* (2013.01); *C08L 2205/03* (2013.01); *C08L 2205/08* (2013.01); *C08L 2207/02* (2013.01); *C08L 2207/10* (2013.01); *C08L 2312/00* (2013.01); *C08L 2312/02* (2013.01)

(58) Field of Classification Search
CPC ........ C08L 23/12; C08L 23/142; C08L 23/16; C08L 2205/03; C08L 2207/02; C08L 2207/10; C08L 2312/00; C08L 2205/022; C08L 2312/02; C08L 2208/08; C08L 2205/025; C08J 3/24; C08J 3/212; C08J 3/005; C08J 2423/12; C08J 2323/16; C08F 210/06; C08F 210/02; C08F 236/045; C08F 4/65927; C08F 2500/24; C08F 2500/21; C08F 4/65908; C08F 2500/17; C08F 236/20; C08F 210/18; C08F 2500/12; C08F 2500/03; C08K 5/0025

See application file for complete search history.

(56) References Cited

U.S. PATENT DOCUMENTS

| 4,701,432 | A | 10/1987 | Welborn, Jr. |
|---|---|---|---|
| 5,077,255 | A | 12/1991 | Welborn, Jr. |
| 5,135,526 | A | 8/1992 | Zinnanti et al. |
| 5,382,630 | A | 1/1995 | Stehling et al. |
| 5,382,631 | A | 1/1995 | Stehling et al. |
| 5,516,848 | A | 5/1996 | Canich et al. |
| 6,069,213 | A | 5/2000 | Nemzek et al. |
| 6,175,409 | B1 | 1/2001 | Nielsen et al. |
| 6,207,606 | B1 | 3/2001 | Lue et al. |
| 6,260,407 | B1 | 7/2001 | Petro et al. |
| 6,294,388 | B1 | 9/2001 | Petro |
| 6,406,632 | B1 | 6/2002 | Safir et al. |
| 6,420,507 | B1 | 7/2002 | Kale et al. |
| 6,436,292 | B1 | 8/2002 | Petro |
| 6,454,947 | B1 | 9/2002 | Safir et al. |

(Continued)

FOREIGN PATENT DOCUMENTS

| EP | 1 120 424 | 8/2001 |
|---|---|---|
| WO | 98/27103 | 6/1998 |

(Continued)

OTHER PUBLICATIONS

Kim, J. D. et al., "Copolymerization of ethylene and α_olefins with combined metallocene catalysts. III. Production of polyolefins with controlled microstructures," J. Polym. Sci. Part A: Polym. Chem., 2000, vol. 38, No. 9, pp. 1427-1432.

Iedema et al., "Predicting the Molecular Weight Distribution of Polyethylene for Mixed Systems with a Constrained-Geometry Metallocene Catalyst in a Semibatch Reactor," Ind. Eng. Chem. Res., 2004, vol. 43, No. 1, pp. 36-50.

U.S. Appl. No. 16/098,592, filed Mar. 31, 2017.
U.S. Appl. No. 16/266,186, filed Feb. 4, 2019.
U.S. Appl. No. 16/315,090, filed Jan. 3, 2019.
U.S. Appl. No. 16/315,294, filed Jan. 4, 2019.
U.S. Appl. No. 16/315,722, filed Jan. 7, 2019.
U.S. Appl. No. 16/315,874, filed Jan. 7, 2019.

(Continued)

*Primary Examiner* — Nathan M Nutter

(57) ABSTRACT

A thermoplastic vulcanizate comprises an isotactic polypropylene matrix phase in which cross-linked rubber particles are dispersed, the rubber particles comprising an ethylene-propylene-diene terpolymer (EPDM) containing at least 40 wt % of ethylene-derived units. A propylene-ethylene-diene terpolymer (PEDM) containing at least 60 wt % propylene-derived units and less than or equal to 25 wt % of ethylene-derived units and having a heat of fusion ($H_f$) of 2 to 10 J/g is added to compatibilize the propylene/EPDM blend.

15 Claims, 14 Drawing Sheets

(56) References Cited

U.S. PATENT DOCUMENTS

| | | |
|---|---|---|
| 6,461,515 B1 | 10/2002 | Safir et al. |
| 6,475,391 B2 | 11/2002 | Safir et al. |
| 6,491,816 B2 | 12/2002 | Petro |
| 6,491,823 B1 | 12/2002 | Safir et al. |
| 6,613,713 B2 | 9/2003 | Becke et al. |
| 6,656,866 B2 | 12/2003 | Wenzel et al. |
| 6,664,348 B2 | 12/2003 | Speca |
| 6,831,141 B2 | 12/2004 | McDaniel et al. |
| 6,846,770 B2 | 1/2005 | Speca |
| 7,141,632 B2 | 11/2006 | Vaughan et al. |
| 7,192,902 B2 | 3/2007 | Brinen et al. |
| 7,241,713 B2 | 7/2007 | Chang et al. |
| 7,355,058 B2 | 4/2008 | Luo et al. |
| 7,385,015 B2 | 6/2008 | Holtcamp |
| 8,088,867 B2 | 1/2012 | Jiang et al. |
| 8,110,518 B2 | 2/2012 | Razavi et al. |
| 8,575,284 B2 | 11/2013 | Luo et al. |
| 8,598,061 B2 | 12/2013 | Yang et al. |
| 8,815,357 B1 | 8/2014 | Inn et al. |
| 8,957,167 B2 | 2/2015 | Hussein et al. |
| 9,023,906 B2 | 5/2015 | Okamoto et al. |
| 9,193,856 B2 | 11/2015 | Ebata et al. |
| 9,196,795 B2 | 11/2015 | Su et al. |
| 9,796,795 B2 | 10/2017 | Canich et al. |
| 9,803,037 B1 | 10/2017 | Canich et al. |
| 2005/0288461 A1 | 12/2005 | Jensen et al. |
| 2007/0061310 A1 | 3/2007 | Ninagawa et al. |
| 2010/0222447 A1 | 9/2010 | Jackson et al. |
| 2014/0031504 A1 | 1/2014 | Jacobsen et al. |
| 2016/0244535 A1 | 8/2016 | Canich et al. |
| 2017/0022332 A1 | 1/2017 | Chung et al. |
| 2017/0292013 A1 | 10/2017 | Blok et al. |
| 2017/0360237 A1 | 12/2017 | Canich et al. |
| 2017/0362350 A1 | 12/2017 | Canich et al. |
| 2018/0002516 A1 | 1/2018 | Canich et al. |
| 2018/0002517 A1 | 1/2018 | Canich et al. |
| 2018/0037731 A1 | 2/2018 | Wu et al. |
| 2018/0134828 A1 | 5/2018 | Doufas et al. |
| 2018/0171040 A1 | 6/2018 | Ye et al. |
| 2019/0284311 A1 | 9/2019 | Canich et al. |
| 2019/0284318 A1 | 9/2019 | Canich et al. |
| 2019/0284319 A1 | 9/2019 | Shah et al. |
| 2019/0309115 A1 | 10/2019 | Datta et al. |
| 2019/0309151 A1* | 10/2019 | Datta et al. ............. C08L 23/12 |
| 2019/0309152 A1* | 10/2019 | Datta et al. ........... C08F 210/02 |

FOREIGN PATENT DOCUMENTS

| | | |
|---|---|---|
| WO | 00/12565 | 3/2000 |
| WO | 2001/042315 | 6/2001 |
| WO | 02/060957 | 8/2002 |
| WO | 2003/025027 | 3/2003 |
| WO | 2004/013149 | 6/2004 |
| WO | 2004/046214 | 6/2004 |
| WO | 2007/080365 | 7/2007 |
| WO | 2012/006272 | 1/2012 |
| WO | 2016/053541 | 4/2016 |
| WO | 2016/053542 | 4/2016 |
| WO | 2016/114914 | 7/2016 |
| WO | 2016/114915 | 7/2016 |
| WO | 2017/034680 | 3/2017 |

OTHER PUBLICATIONS

Hong et al., "Immobilized Me2Si(C5Me4)(N_tBu)TiCl2/(nBuCp)2ZrCl2 hybrid metallocene catalyst system for the production of poly(ethylene_co_hexene) with pseudo_bimodal molecular weight and inverse comonomer distribution," Polymer Engineering and Science, 2007, vol. 47, No. 2, pp. 131-139.

Paul et al., Polymer Blends (or Alloys), J. Macromol. Sci.-Rev. Macromol. Chem., 1980, vol. C18, No. 1, pp. 109-168.

Boyce et al., "Micromechanisms of deformation and recovery in thermoplastic vulcanizates," Journal of the Mechanics and Physics of Solids, 2001, vol. 49, pp. 1323-1342.

Boyce et al., "Micromechanics of cyclic softening in thermoplastic vulcanizates," Journal of the Mechanics and Physics of Solids, 2001, vol. 49, pp. 1343-1360.

L. A. Utracki, "Polymer Alloys and Blends—Thermodynamics and Rheology", Hanser Publishers, New York, (1990).

* cited by examiner

THERMOPLASTIC VULCANIZATE COMPOSITIONS

PRIORITY CLAIM

This application claims priority to and the benefit of U.S. Ser. No. 62/653,734 filed Apr. 6, 2018 and is incorporated by reference in its entirety.

STATEMENT OF RELATED APPLICATIONS

This invention also relates to:
1) U.S. Ser. No. 16/356,910, filed concurrently herewith, entitled "Thermoplastic Vulcanizate Compositions";
2) U.S. Ser. No. 16/356,894, filed concurrently herewith, entitled "Compatibilized Thermoplastic Vulcanizate Compositions";
3) U.S. Ser. No. 16/356,588, filed concurrently herewith, entitled "Processes for Producing High Propylene Content PEDM using Tetrahydroindacenyl Catalyst Systems", which claims priority to and the benefit of U.S. Ser. No. 62/644,971, filed Mar. 19, 2018;
4) U.S. Ser. No. 16/356,772, filed concurrently herewith, entitled "Processes for Producing High Propylene Content PEDM Having Low Glass Transition Temperatures Using Tetrahydroindacenyl Catalyst Systems"; which claims priority to and the benefit of U.S. Ser. No. 62/644,971, filed Mar. 19, 2018;
5) U.S. Ser. No. 16/356,826, filed concurrently herewith, entitled "Multiple Non-Coordinating Anion Activators for Propylene-Ethylene-Diene Monomer Polymerization Reactions"; and
6) U.S. Ser. No. 16/356,844, filed concurrently herewith, entitled "Compatibilized Thermoplastic Vulcanizate Compositions", claims priority to and the benefit of U.S. Ser. No. 62/653,734 filed Apr. 6, 2018.

FIELD

The present disclosure relates to thermoplastic vulcanizate compositions and methods for preparing the same.

BACKGROUND

The first commercial thermoplastic vulcanizate, or TPV, was Santoprene™, which was introduced early in the 1980s. Thermoplastic vulcanizates are thermoplastic elastomers, not thermoset rubbers, and can be processed or re-processed as thermoplastics. Thermoplastic vulcanizates differ from thermoplastics at least by inclusion of dispersed vulcanized rubber particles. Vulcanization, or crosslinking, of rubbers in TPVs is necessary to keep the rubber, which is the majority blend component, as the dispersed phase, instead of the continuous phase. Following the Paul-Barrow continuity criterion (D. R. Paul and J. W. Barlow, J. Maromol. Sci., Rev. Macromol. Chem., C18, 109, (1980)), where phi 1/phi 2=eta 1/eta 2, the phase with infinite viscosity, such as crosslinked rubbers, would stay dispersed. This allows the packing of a maximum amount of rubber dispersion in a plastic matrix without rubber phase inversion. The maximum packing volume percent is limited by packing physics and is typically less than 70 vol %. By squeezing in greater than 60 vol % of crosslinked rubber dispersions inside a plastic matrix, the plastic matrix becomes inter-connecting plastic ligaments sandwiched in between dispersed crosslinked rubber particles.

Without being bound by any theory, the elasticity of a TPV is thought to derive from these thin plastic ligaments sandwiched between dispersed rubber particles. Based on experimental findings and theoretic modeling (e.g., as by M. C. Boyce, S. Socrate, K. Kear, O. Yeh, and K. Shaw, *J. Mech. Phys. Solids*, 49, 1323, (2001), and *J. Mech. Phys. Solids*, 49, 1343, (2001), these thin plastic ligaments kink or plastic flow during TPV deformation by the incompressible deformation of sandwiching crosslinked rubber dispersions. Subsequently, these plastic ligament kinks act as spatial registrations to allow elastic recovery and to deliver elasticity. Thinner plastic ligaments would be easily deformed and also yield easily, for plastic flow/kink formation, relative to thick plastic ligaments. If the plastic matrix has plastic patches that are relatively large between dispersed rubber particles, these plastic flows and kink developments are not possible and this leads to poorer elastic properties. Rubber dispersion size and uniformity are important to create a uniform plastic ligament network. Greater uniformity of the plastic ligament network promotes the elastic properties of a TPV.

The particle size and uniformity of the rubber dispersion in a TPV thus can constrain the selection of plastic and rubber components for the preparation of a TPV. For a Santoprene™ TPV, which is a TPV based on isotactic polypropylene (iPP) plastic matrix, and crosslinked ethylene-propylene-diene terpolymer (EPDM) rubber dispersions, it is important to use fractional melt-flow rate (MFR) iPP to blend with EPDM in a mixer before the introduction of curatives. Since EPDM typically has much higher molecular weight (MW) than that of an iPP, use of low MFR and high MW iPP provides helpful viscosity matching during initial blending. Viscosity matching allows stress transfer across blend interfaces to produce finer dispersions (L. A. Utracki, "Polymer Alloys and Blends-Thermodynamics and Rheology", Hanser Publishers, New York, (1990)). In the case of preparing TPVs, viscosity matching promotes fine iPP dispersions inside the EPDM matrix. Once the curatives are introduced, phase inversion occurs and crosslinked EPDM becomes the dispersed phase. Although decent dispersion of crosslinked rubber can be obtained in a TPV by judicious selections of plastic and rubber components (for viscosity matching) and of twin screw extrusion elements (for phase inversion and rubber dispersion in the production process), there is interest in further improving crosslinked rubber dispersion uniformity in a TPV to secure better elastic properties.

Additionally it is thought that compatibilizers in polymer blends can suppress droplet coalescence, reduce interfacial tension, and lead to finer dispersions (L. A. Utracki, "Polymer Alloys and Blends—Thermodynamics and Rheology", Hanser Publishers, New York, (1990)).

SUMMARY

In the present disclosure, a crosslinkable low crystallinity propylene-based elastomer, comprising (or consisting of, or consisting essentially of) one or more propylene-ethylene-diene terpolymer(s) (PEDM), is added to compatibilize blends of EPDM and iPP prior to phase inversion during dynamic vulcanization. The compatibilizer can be synthesized by organometallic coordinative insertion polymerization of propylene, ethylene, and diene—with majority propylene, preferably greater than 60 wt % by weight of the PEDM terpolymer. Using PEDM compatibilizers in polymer blends can suppress droplet coalescence, reduce interfacial tension, and lead to finer dispersions. Adding a PEDM compatibilizer during PP/EPDM TPV preparation prior to vulcanization can provide fine PP dispersions, which, after vulcanization and phase inversion, provide fine dispersions of vulcanized EPDM inside the TPV with a result of improved mechanical toughness.

According to one aspect of the present disclosure, there is provided a thermoplastic vulcanizate comprising an isotactic polypropylene matrix phase in which cross-linked rubber particles are dispersed, the thermoplastic vulcanizate comprising the reaction product of a mixture comprising:
(a) at least 10 wt % of isotactic polypropylene;
(b) at least 25 wt % of an ethylene-propylene-diene terpolymer (EPDM) containing at least 40 wt % of ethylene-derived units;
(c) at least 0.5 wt % of a propylene-ethylene-diene terpolymer (PEDM) containing at least 60 wt % propylene-derived units and less than or equal to 25 wt % of ethylene-derived units and having a heat of fusion (Hf) of 2 to 10 J/g; and
(d) at least 0.015 wt % of at least one curative,
wherein the percentages of components (a) to (d) are based on the total weight of the mixture.

In a further aspect of the present disclosure, there is provided a thermoplastic vulcanizate comprising an isotactic polypropylene matrix phase in which cross-linked rubber particles are dispersed, the thermoplastic vulcanizate comprising the reaction product of a mixture comprising:
a) 20 to 30 wt % of isotactic polypropylene (iPP);
b) 35 to 55 wt % of an ethylene-propylene-diene terpolymer (EPDM) containing at least 40 wt % of ethylene-derived units;
c) 0.5 to 15 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g;
d) 5 to 25 wt % of a diluent; and
e) 0.015 to 0.03 wt % of at least one curative;
wherein the percentages of components (a) to (e) are based on the total weight of the mixture.

In a further aspect of the present disclosure, there is provided a process for producing a thermoplastic vulcanizate (TPV) comprising:
(i) providing a mixture comprising:
(a) at least 10 wt % of isotactic polypropylene;
(b) at least 25 wt % of an ethylene-propylene-diene terpolymer (EPDM) containing at least 50 wt % of ethylene-derived units;
(c) at least 0.5 wt % of a propylene-ethylene-diene terpolymer (PEDM) containing at least 60 wt % propylene-derived units and less than or equal to 25 wt % of ethylene-derived units and having a heat of fusion (Hf) of 2 to 10 J/g;
(d) at least 5 wt % of a diluent; and
(e) at least 0.015 wt % of at least one curative,
wherein the percentages of components (a) to (e) are based on the total weight of the mixture.
(ii) reacting the mixture under shear and at a temperature above the melting point of the polypropylene to at least partially cross-link the EPDM and PEDM and produce a polypropylene matrix phase in which cross-linked rubber particles are dispersed.

BRIEF DESCRIPTION OF THE DRAWINGS

FIG. 4A, FIG. 4B, and FIG. 4C are examples 3, 4 and 5, respectively and FIG. 4D, FIG. 4E, and FIG. 4F examples 6, 7, and 8, and 6, respectively.

DETAILED DESCRIPTION

Figure 1A:
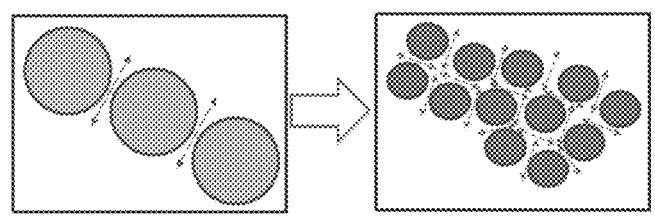
FIG. 1A illustrates rubber dispersion size and plastic ligament formation (left: large dispersions (only 2 ligaments), right: small dispersions (16 ligaments), both have the same rubber volume percent).
Figure 1B:
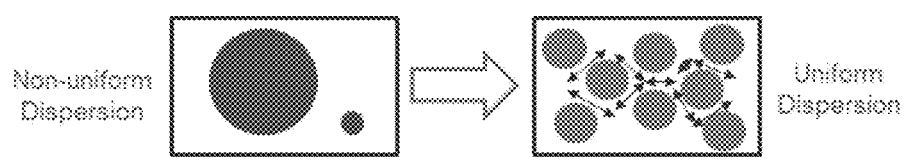
FIG. 1B illustrates rubber dispersion uniformity and plastic ligament formation (left: poor dispersion uniformity, right: good dispersion uniformity, both have the same rubber volume percent).

In the present disclosure, a low crystallinity propylene-based elastomer is used to compatibilize blends of EPDM and iPP prior to their phase inversion by vulcanization. Such a compatibilizer is typically synthesized by organometallic coordinative insertion polymerization of propylene, ethylene and diene, with majority (generally greater than 60 wt %) propylene, and is called a propylene-ethylene-diene terpolymer (PEDM). Utilizing PEDM compatibilizers in polymer blends can suppress droplet coalescence, reduce interfacial tension, and lead to finer dispersions. Adding a PEDM compatibilizer during PP/EPDM TPV preparation prior to vulcanization can provide fine PP dispersions, which, after vulcanization and phase inversion, lead to fine EPDM dispersions inside the TPV, which provides a TPV with improved mechanical toughness. FIG. 1A shows that the number of plastic ligaments in a network increases with decreasing size of the rubber particles dispersed in the plastic matrix phase. FIG. 1B shows how increasing the uniformity of the rubber particle size dispersion provides a more distributed and more uniform plastic filament network having thinner ligaments.

For example, a TPV composition as presently disclosed can be one that has a particle size dispersity index (PSDI) of less than 5.0, although more typically the PSDI in a TPV composition as presently disclosed is less than 4.0, or less than 3.5, or less than 3.0. For example, the PSDI of a TPV according to the present disclosure can be from 1.2-6.5, or from 1.2-5, from 1.2-4, from 1.2-3.5, from 1.2-3.0, or from 1.5-3.0.

TPV Compositions

Thermoplastic vulcanizate (TPV) compositions of various embodiments may comprise, consist essentially of, or consist of: (a) an at least partially vulcanized rubber component dispersed within a continuous thermoplastic matrix; (b) oil; and, optionally, (c) one or more additives (e.g., one or more fillers, foaming agents, compatibilizers or the like). As used in this context, "consist essentially of" means that the TPV composition is free of other materials except those minor impurities (e.g., 0.1 wt % or less) that one would typically expect in normal commercial production operations. For instance, a single process line may be used in a continuous process to create multiple different types of materials in series, and some residuals (e.g., residual polymer, monomer, curative, additives, or other material) from previous product campaigns may acceptably be left in such equipment and thus incorporated into a TPV product.

TPV compositions are formed by dynamically vulcanizing a TPV formulation. The TPV formulation of various embodiments comprises (i) a rubber component (which may or may not be oil-extended); (ii) a thermoplastic resin; (iii) an optional, polyolefin-based, typically propylene-based, elastomer (PBE) (which may be especially useful in compositions comprising Santoprene™) or a hydrogenated triblock copolymerized thermoplastic elastomer (TPE—for example hydrogenated Kraton™ (Kraton Polymers)); (iv) a vulcanizing agent or curative; (v) processing oil; (vi) a compatibilizer; and (vii) optionally, one or more additives (including, e.g., cure accelerators, metal oxides, acid scavengers, flame retardants, fillers, stabilizers, and the like). A TPV product may therefore alternatively be considered and described as the reaction product of dynamic vulcanization of a TPV formulation or "melt", or as a "dynamically vulcanized alloy" (DVA).

A TPV composition can be prepared in which the rubber component is not vulcanized, but instead comprises polymer chains associated with one another by physical means and thus promoting the inversion of the rubber and plastic phases, such as hydrogen bonds, ionic aggregation, and phase transition (e.g., crystallization or a glass transition); thus, a TPV formulation not yet subjected to a covalent cross-linking chemical reaction can be prepared in which physical cross links can be removed by heating.

In one embodiment, the TPV composition described herein comprises an isotactic polypropylene matrix phase in which cross-linked rubber particles are dispersed, wherein the TPV is the reaction product of a mixture comprising: (a) at least 10 wt % of isotactic polypropylene; (b) at least 25 wt % of an ethylene-propylene-diene terpolymer (EPDM) containing at least 40 wt % of ethylene-derived units; (c) at least 0.5 wt % of a propylene-ethylene-diene terpolymer (PEDM) compatibilizer containing at least 60 wt % propylene-derived units and less than or equal to 25 wt % of ethylene-derived units and having a heat of fusion (Hf) of 2 to 10 J/g; and (d) at least 0.015 wt % of at least one curative, wherein all the percentages of components (a) to (d) are based on the total weight of the mixture.

In a further embodiment, the TPV composition described herein is the reaction product of a mixture comprising: (a) 20 to 30 wt % of isotactic polypropylene (iPP); (b) 35 to 55 wt % of an ethylene-propylene-diene terpolymer (EPDM) containing at least 40 wt % of ethylene-derived units; (c) 0.5 to 15 wt % of a propylene-ethylene-diene terpolymer (PEDM) compatibilizer containing at least 60 wt % propylene-derived units and less than or equal to 25 wt % of ethylene-derived units and having a heat of fusion ($H_f$) of 2 to 10 J/g; (d) 5 to 25 wt % of a diluent; and (e) 0.015 to 0.03 wt % of at least one curative; wherein all the percentages of components (a) to (e) are based on the total weight of the mixture.

Thermoplastic Matrix Component

TPV formulations and/or TPV compositions generally include a thermoplastic matrix component comprising at least one olefinic thermoplastic resin. The thermoplastic resin may be a polymer or polymer blend considered by persons skilled in the art as being thermoplastic in nature, e.g., a solid polymer that softens and becomes molten when exposed to heat and returns to solid when cooled to 23° C. The olefinic thermoplastic component may contain one or more polyolefins, including polyolefin homopolymers and polyolefin copolymers.

The thermoplastic matrix component of the present TPV compositions comprises, or in some embodiments consists of, isotactic polypropylene. The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. See Polymer sequence distribution $^{13}C$ NMR method by J C Randall, Academic Press 1977.

Perfectly isotactic PP has a melting point of 171° C. (340° F.). Commercial isotactic PP typically has a melting point that ranges from 160 to 166° C. (320 to 331° F.), depending on atactic material content and crystallinity.

In some embodiments, the thermoplastic resin has melt flow rate (MFR) of 20 g/10 min or less, 15 g/10 min or less, more preferably 10 or less, 5 or less, 3 or less, or even 1 or less, in some embodiments (measured per ASTM D1238, at 230° C. (446° F.) and 2.16 kg mass). For instance, MFR of the thermoplastic resin may be within the range from a low of any one of 0.01, 0.1, and 0.5 g/10 min to a high of any one of 1, 3, 5, 10, 15, 16 or 20 g/10 min (ASTM D1238, 230° C. (446° F.) and 2.16 kg). In certain of these embodiments, the thermoplastic component comprises only thermoplastic resin with MFR according to the foregoing description.

Typically, isotactic polypropylene makes up at least 10 wt %, such as at least 15 wt %, up to 40 wt % of the mixture (based on total weight of the TPV, including any processing and/or extender oils, diluents) used to produce the present TPV composition and/or TPV formulation. In some embodiments, suitable mixtures subjected to dynamic vulcanization to produce the present TPVs can include 20 to 30 wt % of one or more isotactic polypropylenes.

Rubber Component

The "rubber" component of TPV formulations or compositions generally is a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked. Generally, the term "rubber" refers to any natural or synthetic polymer exhibiting elastomeric properties, and may be used herein synonymously with "elastomer." The rubber component may comprise one rubber, or a mix of two or more rubbers.

In the TPV compositions presently disclosed, one or more EPDM rubbers are used as the rubber component.

For example, the rubber component can be any ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. U.S. Pat. Nos. 3,037,954 and 4,811,628, hereby incorporated by reference in their entirety and for all purposes, describe TPVs having a polypropylene matrix and EPDM rubber component.

The EPDM rubber can be one that comprises at least 40 wt %, such from 50-80 wt %, of ethylene-derived units and 1-15 wt % of diene-derived units. Dienes may be conjugated or non-conjugated, acyclic or cyclic. Preferably, the dienes are non-conjugated. Dienes can include 5-ethylidene-2-norbornene (ENB); 5-vinyl-2-norbornene (VNB); 1,4-hexadiene; 5-methylene-2-norbornene (MNB); 1,6-octadiene; 5-methyl-1,4-hexadiene; 3,7-dimethyl-1,6-octadiene (MOD); 1,3-cyclopentadiene; 1,4-cyclohexadiene; dicyclopentadiene (DCPD); and combinations thereof. Other exemplary dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and isomers thereof. Examples of α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene. Low molecular weight polybutadienes (Mw less than 1000 g/mol) may also be used as the diene, which is sometimes also referred to as a polyene. Suitable dienes comprise 5-ethylidene-2-norbornene (ENB), 5-vinyl-2-norbornene, divinyl benzene, and dicyclopentadiene, with ENB being preferred. More typically, the EPDM rubber can be one that comprises from 45-75 wt % ethylene and 2-10 wt % ethylene norbornene, or from 50-65% ethylene and 2 to 10% ethylene norbornene.

The rubber component is generally present in the TPV formulation in an amount of at least 25 wt % and, in some embodiments, up to about 65 wt %, such as from 35 to 55 wt %, based on total weight of the TPV, including any processing and/or extender oils, diluents.

Propylene-Ethylene-Diene Terpolymer Compatibilizer

As explained above, it has been found that incorporating a PEDM compatibilizer into the TPV formulation (or composition) provides an improvement in particle size distribution, measured as Dw/Dn (see test methods below) and called "particle size dispersity index" (PSDI) with an attendant improvement in some physical properties of the resulting TPV composition. The improvement that is reduction, in PSDI is over and above that achieved by only viscosity matching the rubber and thermoplastic components. In any embodiment, the inventive composition may have a Dw/Dn (PSDI) of less than 8, or 7, or 6, or 5, or 4, or 3, or 2.5, or within a range from 1, or 2 to 2.5, or 3, or 4, or 5, or 6, or 7, or 8.

The compatibilizer employed in the present TPV composition is a propylene-ethylene-diene terpolymer (PEDM) is typically added in an amount of at least 0.5 wt %, such as from 0.5 to 20 wt %, such as from 0.5 to 15 wt %, or from 1 to 15 wt %, or from 2 to 10 wt %, of the reaction mixture used to produce the TPV composition (i.e., based on total weight of the TPV, including any processing and/or extender oils, diluents). In embodiments, the amount of PEDM in the reaction mixture used to produce the TPV composition is less than 50 wt %, such as from 2 to 30 wt %, for example from 5 to 25 wt %, of the combined weight of the EPDM and PEDM in the reaction mixture.

The "propylene-ethylene-diene terpolymer" as used herein may be any polymer comprising predominantly propylene, together with ethylene, one or more dienes and optionally other comonomers, such as styrene or norbornene. The term "polymer" refers to any carbon-containing compound having repeat units from one or more different monomers. Preferably the propylene-ethylene-diene based polymer consists essentially of propylene-derived units, ethylene-derived units and diene-derived units.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

The optional comonomers may be linear, branched or cyclic, typically linear or branched. Preferred linear comonomers include $C_4$ to $C_8$ α-olefins, more preferably 1-butene, 1-hexene, and 1-octene. Preferred branched comonomers include 4-methyl-1-pentene, 3-methyl-1-pentene, 2-ethyl-1-butene, and 3,5,5-trimethyl-1-hexene. In one or more embodiments, the comonomers may include styrene.

The propylene-ethylene-diene terpolymer may contain at least 60 wt %, such as at least 70 wt % up to 80 wt %, even up to 90 wt %, propylene-derived units.

The propylene-ethylene-diene terpolymer (PEDM) preferably contains less than or equal 25 wt % of ethylene-derive units. In embodiments, the PEDM may contain from 2 wt % to 25 wt %, such as from 5 wt % to 20 wt %, or from 5 wt % to 18 wt %, of ethylene-derived units.

Preferably, the propylene-ethylene-diene terpolymer comprises a diene content of from 0.3 wt % to 20 wt % based on the weight of the PEDM polymer, or from 0.3 wt % to 15 wt %, or from 0.3 wt % to 10 wt %, or 1 wt % to 10 wt %, or from 1 wt % to 5 wt %, based on the weight of the PEDM polymer.

The propylene-ethylene-diene terpolymer may have a weight average molecular weight (Mw) of 5,000,000 g/mol or less, a number average molecular weight (Mn) of 3,000,000 g/mol or less, a z-average molecular weight (Mz) of 10,000,000 g/mol or less, and a g' index (also referred to as branching index (g')), of 0.95 or greater measured at the weight average molecular weight (Mw) of the polymer using isotactic polypropylene as the baseline, all of which may be determined by size exclusion chromatography as described below. The propylene-ethylene-diene terpolymer may have an Mn of from 5,000 to 5,000,000 g/mole, or from 10,000 to 1,000,000 g/mole, or from 20,000 to 500,000 g/mole, or from 30,000 to 400,000 g/mole.

The molecular weight distribution index (MWD=(Mw/Mn)), sometimes referred to as a "polydispersity index" (PDI), of the propylene-ethylene-diene terpolymer may be from 1.2 to 40. For example, the propylene-ethylene-diene terpolymer may have an MWD with an upper limit of 40, or 20, or 10, or 9, or 7, or 5, and a lower limit of 1.2, or 1.5, or 1.7. In one or more embodiments, the MWD of the propylene-ethylene-diene terpolymer is 1.5 to 7, or from 1.7 to 5.

The propylene-ethylene-diene terpolymer may have a g' index value of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l},$$

where $\eta_b$ is the intrinsic viscosity of the propylene-ethylene-diene terpolymer and $\eta_l$ is the intrinsic viscosity of a linear propylene polymer of the same viscosity-averaged molecular weight ($M_v$) as the propylene-ethylene-diene terpolymer. Thus, $\eta_l = K M_v^{\alpha}$, where K and α are measured values for linear polymers and unless otherwise indicated, α=0.705 and K=0.0002288 for linear propylene polymers.

The propylene-ethylene-diene terpolymer may have a density of from 0.83 g/cm³ to 0.92 g/cm³, or from 0.85 g/cm³ to 0.91 g/cm³, or from 0.85 g/cm³ to 0.90 g/cm³, at 23° C. as measured per the ASTM D-1505 test method.

The propylene-ethylene-diene terpolymer may have a melt flow rate (MFR, 2.16 kg weight at 230° C.), equal to or greater than 0.2 g/10 min as measured according to the ASTM D-1238. Preferably, the MFR (2.16 kg at 230° C.) is from 0.2 g/10 min to 200 g/10 min, or from 0.2 g/10 min to 100 g/10 min, or from 0.2 g/10 min to 50 g/10 min, or from 0.2 g/10 min to 30 g/10 min, or from 0.2 g/10 min to 25 g/10 min, or from 0.5 g/10 min to 25 g/10 min The propylene-ethylene-diene terpolymer may have a Mooney viscosity MST (5+4) at 230° C., as determined according to ASTM D1646, of greater than 10, such as from 10 to 90, such as from 20 to 80.

The propylene-ethylene-diene terpolymer may have a heat of fusion ($H_f$) determined by the DSC procedure described below, from 2 to 10 Joules per gram (J/g), such as from 2 to 5 J/g. The crystallinity of the propylene-ethylene-diene terpolymer may also be expressed in terms of percentage of crystallinity (i.e., % crystallinity), as determined according to the DSC procedure described below. The propylene-ethylene-diene terpolymer may have a % crystallinity of 1 to 5%. The degree of crystallinity (%) is determined by dividing heat of fusion measured (in J/g) by the heat of fusion for 100% crystalline polypropylene which has the value of 207 J/g (B. Wunderlich, Thermal Analysis, Academic Press, 1990, pp. 417-431) and multiplying by 100.

The propylene-ethylene-diene terpolymer preferably may have a single broad melting transition. However, the propylene-ethylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the propylene-ethylene-diene terpolymer. PEDM terpolymers are typically amorphous.

The propylene-ethylene-diene terpolymer may have a melting point, as measured by the DSC procedure described herein, of equal to or less than 100° C., or less than 90° C., or less than 80° C., or less than or equal to 75° C. In one or more embodiments, the propylene-ethylene-diene terpolymer may have a melting point of from 10° C. to 80° C., or from 15° C. to 75° C., or from 20° C. to 70° C. In one or more embodiments, the propylene-ethylene-diene terpolymer may not have a melting point and is amorphous.

The propylene-ethylene-diene terpolymer can have a glass transition (Tg) range, as determined by the DSC procedure described herein, from −25° C. to −2° C., or from −20° C. to −2° C., or from −15° C. to −2° C., or from −10° C. to −2° C.

The Differential Scanning calorimetry (DSC) procedure may be used to determine heat of fusion, glass transition range, and melting temperature of the propylene-ethylene-diene terpolymer. The method is as follows: approximately 6 mg of material placed in microliter aluminum sample pan. The sample is placed in a Differential Scanning calorimeter (Perkin Elmer or TA Instrument Thermal Analysis System) and is heated from ambient to 210° C. at 10° C./minute and held at 210° C. for 5 minutes. Afterward, the sample is cooled down to −40° C. at 10° C./minute and this cooling curve is used to measure the Tg. The sample is held at −40° C. for 5 minutes and then heated from −40° C. to 210° C. at 10° C./minute. During the second heating cycle, appearance of melting indicates crystallinity and thus measured heat of fusion is used to compute the crystallinity. The thermal output, recorded as the area under the melting peak of the sample, is a measure of the heat of fusion and is expressed in Joules per gram of polymer. The melting point is recorded as the temperature of the greatest heat absorption within the range of melting of the sample relative to a baseline measurement for the increasing heat capacity of the polymer as a function of temperature.

Details of preparation of propylene-ethylene-diene terpolymer employed as the compatibilizer herein may be found in U.S. Pat. No. 7,605,217, hereby incorporated by reference in its entirety.

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha-olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., an API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from Chevron-Texaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation in amounts within the range from 10 to 70 wt %, preferably 20 to 60 wt %, such as 40 to 60 wt %, such weight percentages based on total weight of the TPV formulation, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation), with ranges from any of the foregoing lows to any of the foregoing highs also contemplated.

Total additive oil (extender oil +process oil) may therefore be within the range from 5 to 350 phr (or 5 to 70 wt %) based on total weight of TPV formulation.

Cure Agents

The TPV reaction mixture also includes a curing or vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046] to [0054] of PCT Application No. PCT/US15/65048, filed Dec. 10, 2015, which description is hereby incorporated by reference. "Curatives" encompasses both vulcanizing agents and curing accelerators.

Curative compositions as described above are typically added to the TPV formulation in an amount of from 0.015 to 0.03 wt % of the TPV formulation, for example from 0.02 to 0.03 or from 0.02 to 0.025 wt %.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

Preparing TPV compositions

As those skilled in the art appreciate, dynamic vulcanization includes a process whereby a rubber that is undergoing mixing with a thermoplastic resin is cured (i.e., crosslinked, or vulcanized). The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a reactor, such as an extruder, melt-mixer, or other reactive mixing device (for example, a Banbury mixer or a Brabender mixer). An intermeshing twin-screw extruder is a preferred mixer. Furthermore, not all components of the TPV formulation need necessarily be introduced to the reactor at the same time. See, for example, U.S. Patent Publication 20170292016, hereby incorporated by reference in its entirety and for all purposes, which discloses addition of colorant and other additives both during and after the dynamic vulcanization process, as well as a "masterbatch" method of adding either or both of a curative formulation and a formulation of additional additives.

For instance, dynamic vulcanization can be performed as follows: The rubber component and thermoplastic component are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend or "melt". The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative (e.g. as a resin-in-oil or "RIO" composition), or after dynamic vulcanization—or at any two or more of the foregoing points in the process. Processing oils are necessary for cooling the extruder to prevent viscous over-heating and to lower the viscosity in order to avoid extruder overtorque.

Methods according to particular embodiments include "preloading" process oil, meaning that a portion of the process oil is introduced to the TPV formulation before the curative is introduced. Surprisingly, it has been found that some degree of oil preloading may result in increased tensile properties of the resulting TPV, without increasing hardness, which may be desired in some foaming applications.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These weight percentage values are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of embodiments of the present disclosure is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

In the present disclosure, the thermoplastic component added to a formulation processed to prepare a TPV can be an isotactic polypropylene (iPP); the rubber component added the TPV formulation can be an EPDM rubber, and a PEDM terpolymer can be added to the TPV formulation as a compatibilizer; such TPV formulation can further include one or more diluents. A "diluent" is a non-reactive, non-curing component such as a mineral oil, naphthenic oil, linear or branched olefin oil, or some combination thereof. During mixing of such a TPV formulation, another portion of a diluent may be added (which may be the same or different from one included in the TPV formulation before such addition) and the mixing continued. Then one or more curatives or curative composition can be added, thus beginning the vulcanizing reactions and providing a reacting TPV formulation, and the mixing continued. A further portion of a diluent can be added and the mixing continued until the reacting is completed to a desired degree, providing a TPV composition, and then the TPV composition is recovered, for example by pressing the composition through an extrusion die at an appropriate temperature.

In some implementations of such a method as above, the EPDM rubber can be added in an amount from 35 to 55 wt % of the TPV formulation, isotactic polypropylene (iPP) can added in an amount from 20 to 30 wt % of the TPV formulation; the total amount of diluent added can be from 13 to 21 wt % of the TPV formulation, and a propylene-ethylene-diene terpolymer (PEDM) compatibilizer can be added in an amount from 0.5 to 15 wt % of the TPV formulation.

In some instances of such a method as above, the curative can be added as a resin-in-oil composition, stannous chloride and zinc oxide. In such instances, typically the RIO composition is added to the mixing TPV formulation, and then after some further mixing, the stannous chloride and zinc oxide are added. The RIO composition can be added to a mixer in which the TPV formulation is reacting from a different physical location on the mixer from the position at which the zinc oxide and stannous chloride are added.

In some instances of a method as disclosed above, the mixing (and reacting, after the curative(s) are added) can be performed at a temperature of from 150 to 200° C. in a batch internal mixer, which can for example be a Brabender or Banbury mixer, running at from 80 to 120 rpm, and the mixing can be continued for about 1 minute between the step of mixing the iPP, EPDM, PEDM and first portion of diluent and the step of adding the second portion of diluent, and the mixing can be continued for about 2 minutes between the addition of the second portion of diluent and adding the curative(s), and the mixing can be continued for about 5 minutes between adding the curative(s) and the step of adding the third portion of diluent, and the mixing can then be continued for about 3 minutes before recovering the TPV composition.

Some instances of a method performed as disclosed above are performed at a temperature from 200 to 250° C. in a continuous twin-screw extruder running at from 50 to 200 RPM with 1 to 5 minutes of residence time of the TPV formulation. In some such implementations, the different components of the TPV formulation can be added from two or more different positions about the mixer. For example, the iPP, EPDM and PEDM components, with a first part of diluent might be added at a first position along the flow of a continuous intermeshing twin-screw extruder, and the second portion of diluent and the curative(s) might be added from a second position downstream from the first position.

Figure 2:
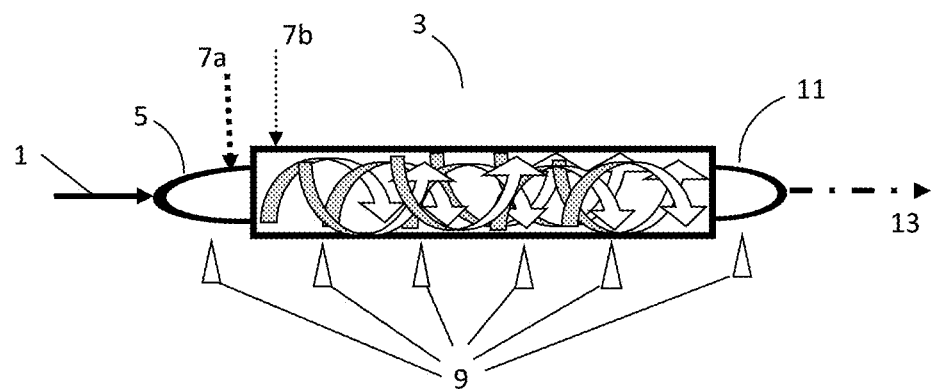
FIG. 2 illustrates schematically one embodiment of a process as disclosed herein and an associated apparatus.

Referring now to FIG. 2, a schematic illustration of one embodiment of a process and associated apparatus according to the present disclosure, a feed 1 comprising one or more of a polypropylene, e.g., iPP, a rubber component, e.g., an EPDM terpolymer, a compatibilizer e.g., a PEDM terpolymer and optional processing oil, is introduced to an internal mixer 3, e.g., an intermeshing twin-screw extruder, via an inlet 5 that is configured to receive the selected ingredients. The mixer is further configured with additional inlets for feeds for additional ingredients 7a, 7b, of the TPV formulation, e.g., one or more of a curative or another additive such as a filler. The mixer is further configured with one or more temperature controllers or heaters 9, configured to raise the temperature of the TPV composition to at least the Tm of the TPV composition and maintain the temperature of the TPV composition within the mixer, including at the inlet, along the length of the mixer and at the outlet 11, at a desired temperature between Tm and the degradation temperature of the TPV composition. The temperature need not be the same from the inlet along the length of the mixer and at the outlet, but can be varied along this path as desired. The melted TPV composition is mixed and reacted to form the thermoplastic vulcanizate and then fed via an outlet 11 to provide a TPV extrudate stream 13 that can be fed, for example, to a pelletizer (not shown) to be cooled and pelleted, or to any other desired downstream process. The outlet 11 can be configured with an extrusion die to shape the extrudate in some fashion if that is desired. The temperature of the outlet 11 is maintained at a desired temperature for extrusion or process for the recovery of the TPV composition by the temperature controller 9 configured to maintain the temperature of the TPV composition at the outlet.

Figure 3:
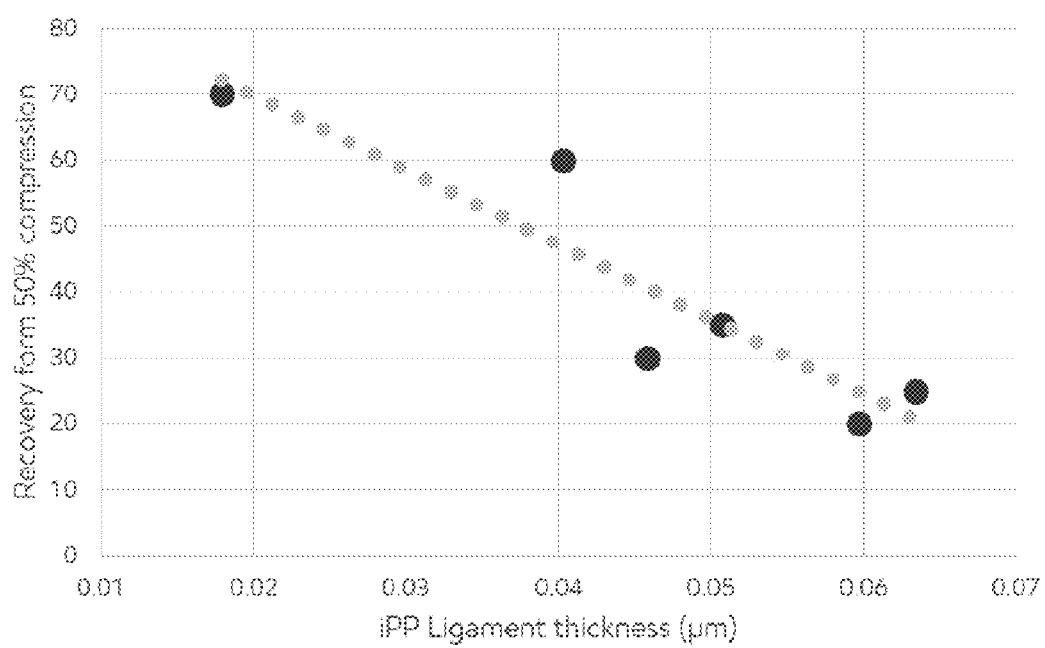
FIG. 3 Correlation of elastic recovery to particle size dispersion in EPDM/iPP TPV.
Figure 4A:
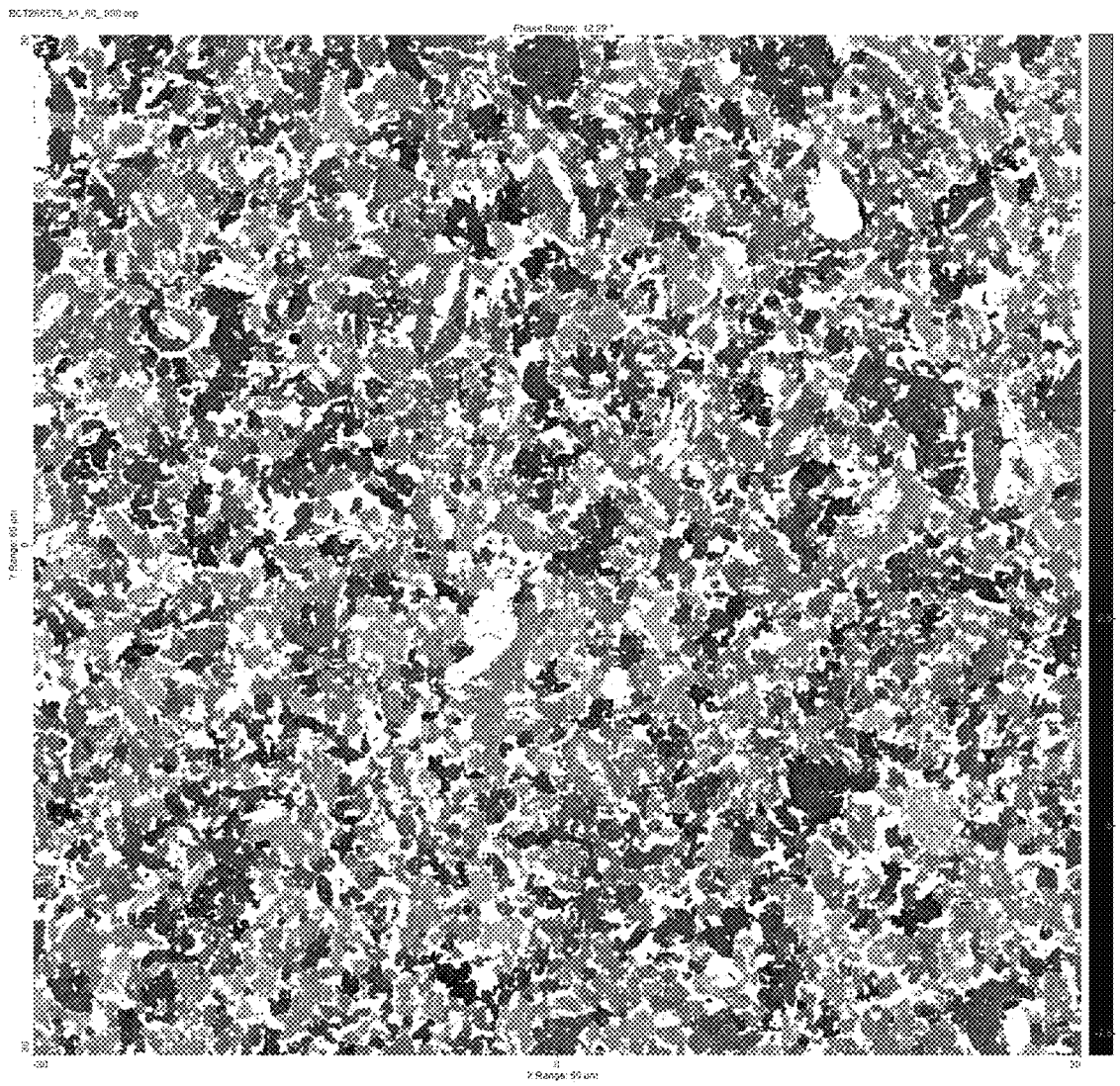
FIGS. 4A-4F show EPDM rubber dispersions in example TPV compositions.
Figure 4B:
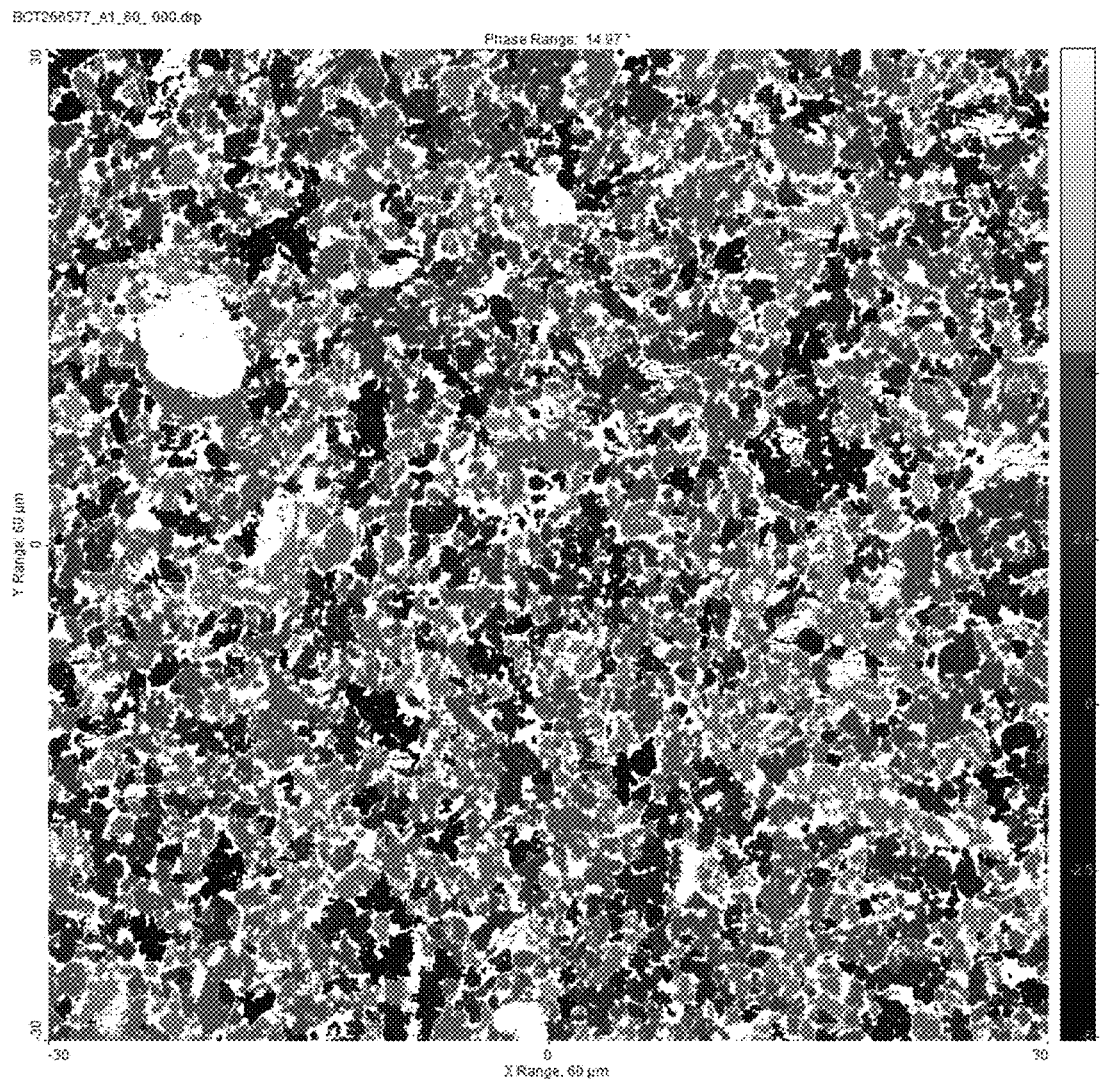
Figure 4C:
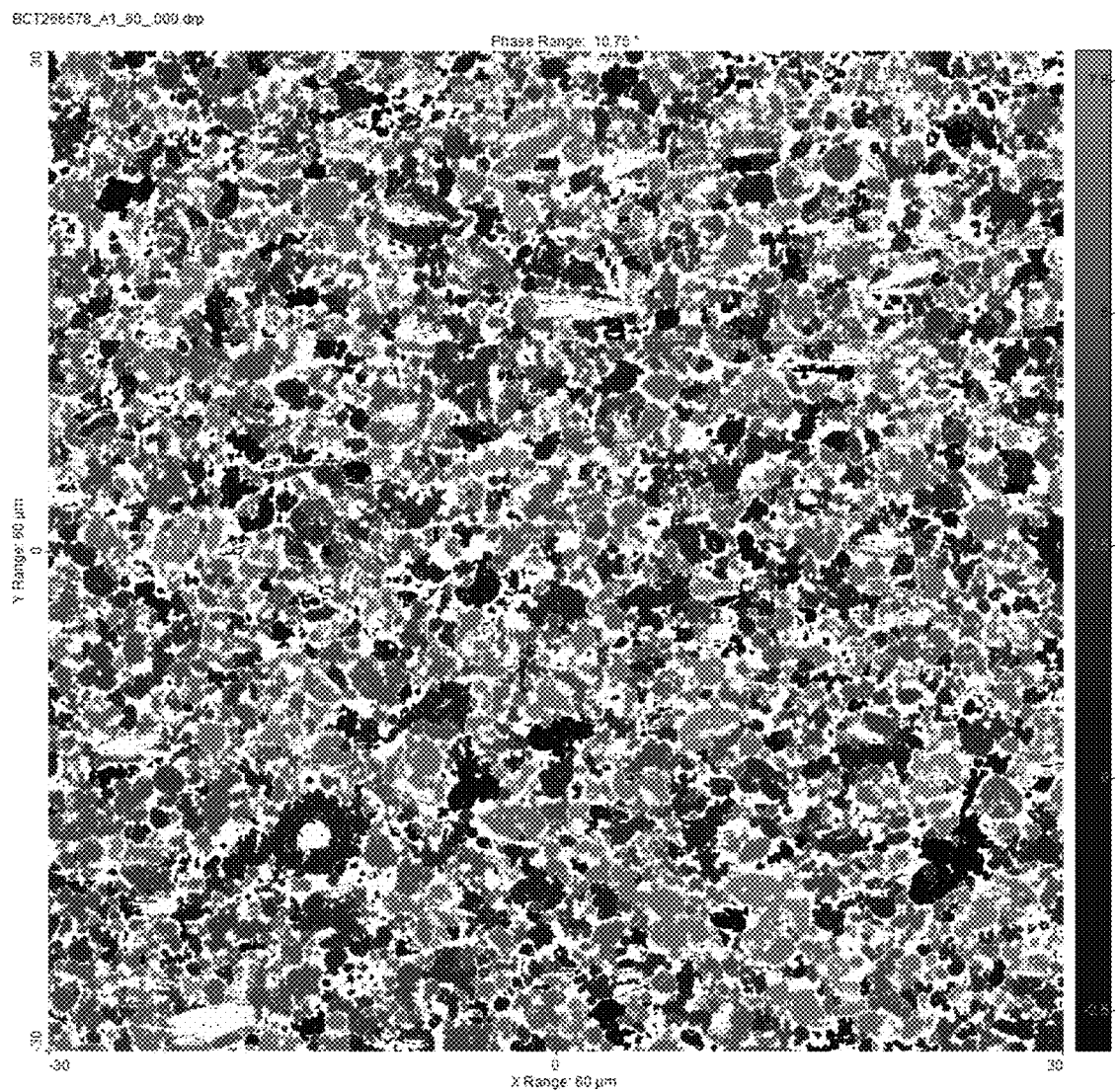
Figure 4D:
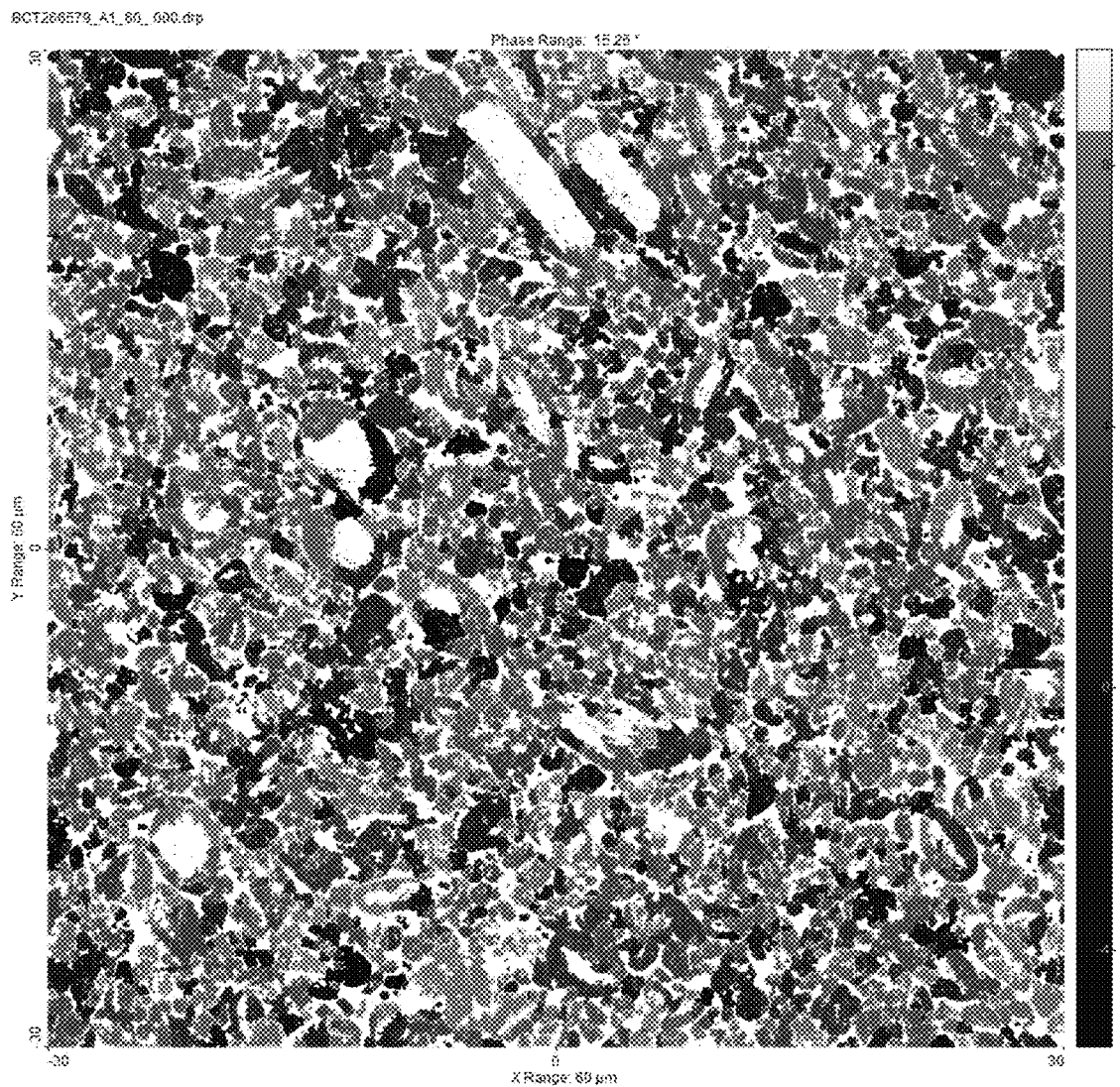
Figure 4E:
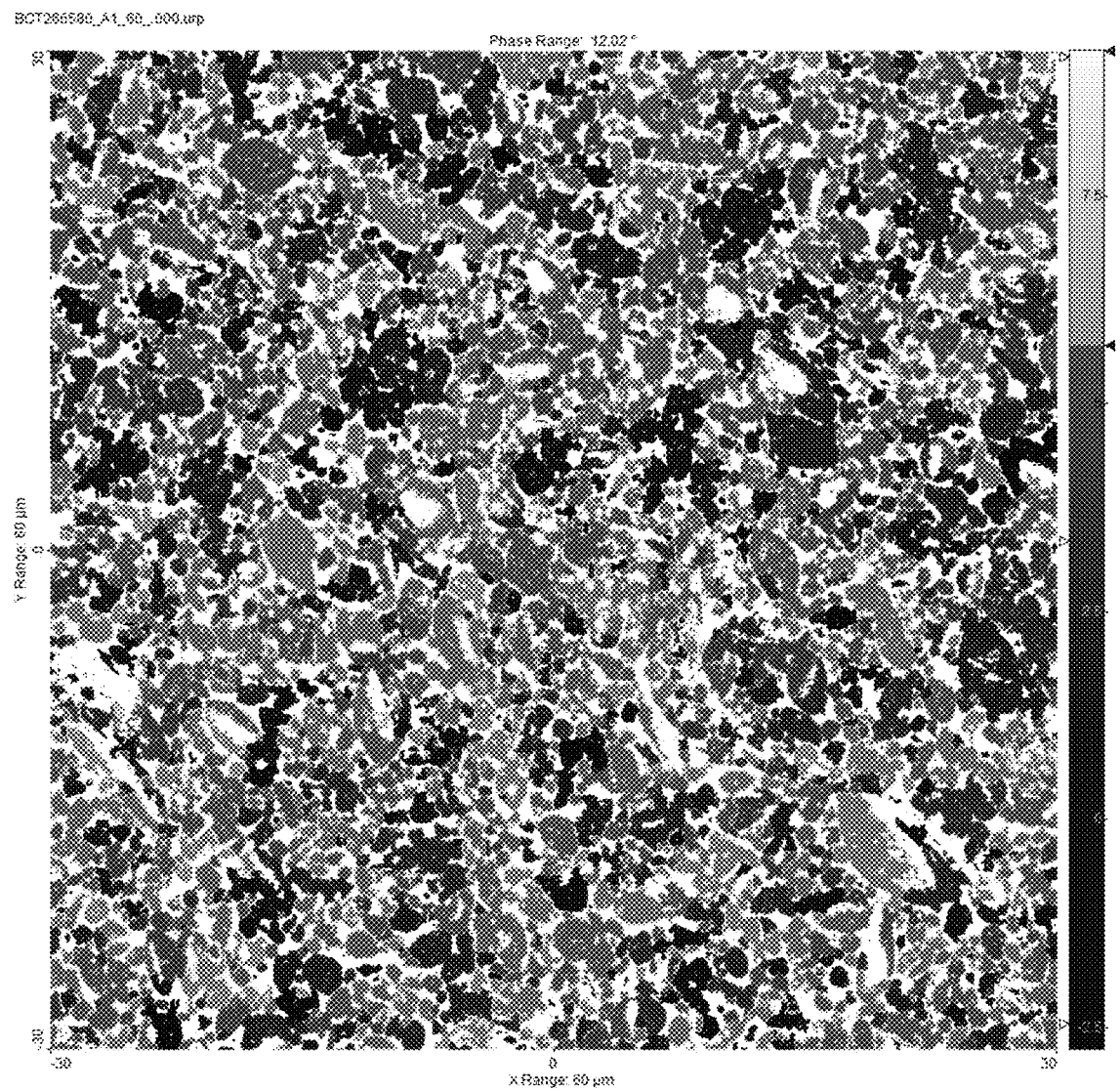
Figure 4F:
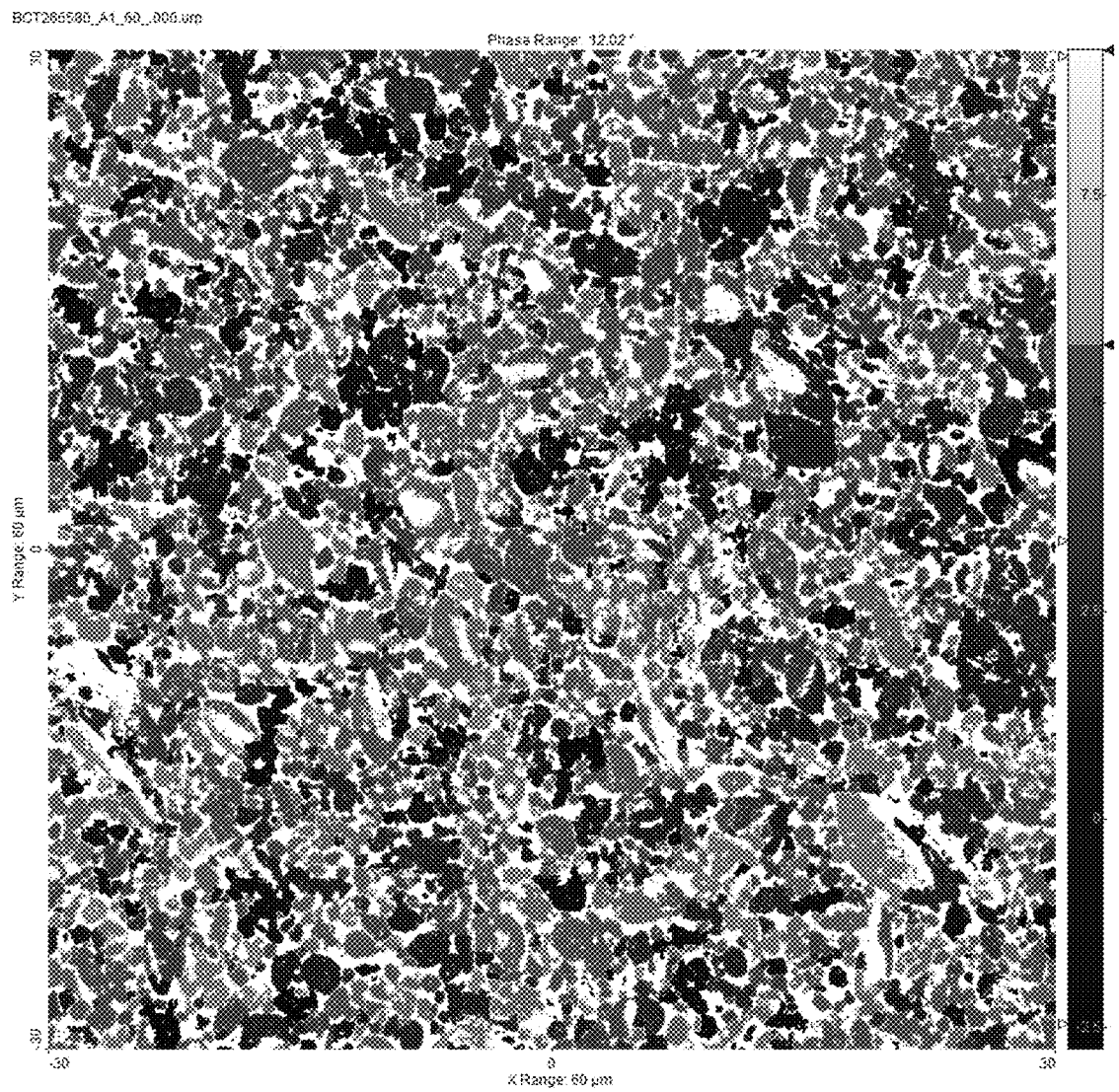
Figure 5A:
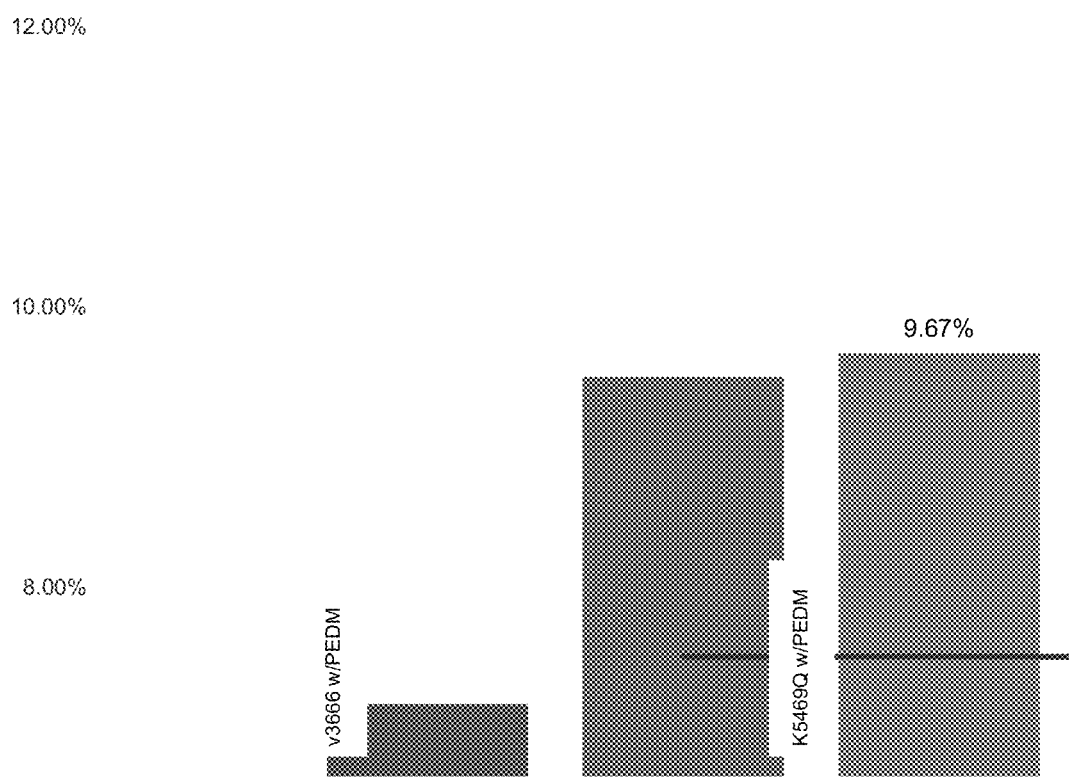
FIGS. 5A-5B show tension set form 25% and 50% elongation for the inventive samples.
Figure 5B:
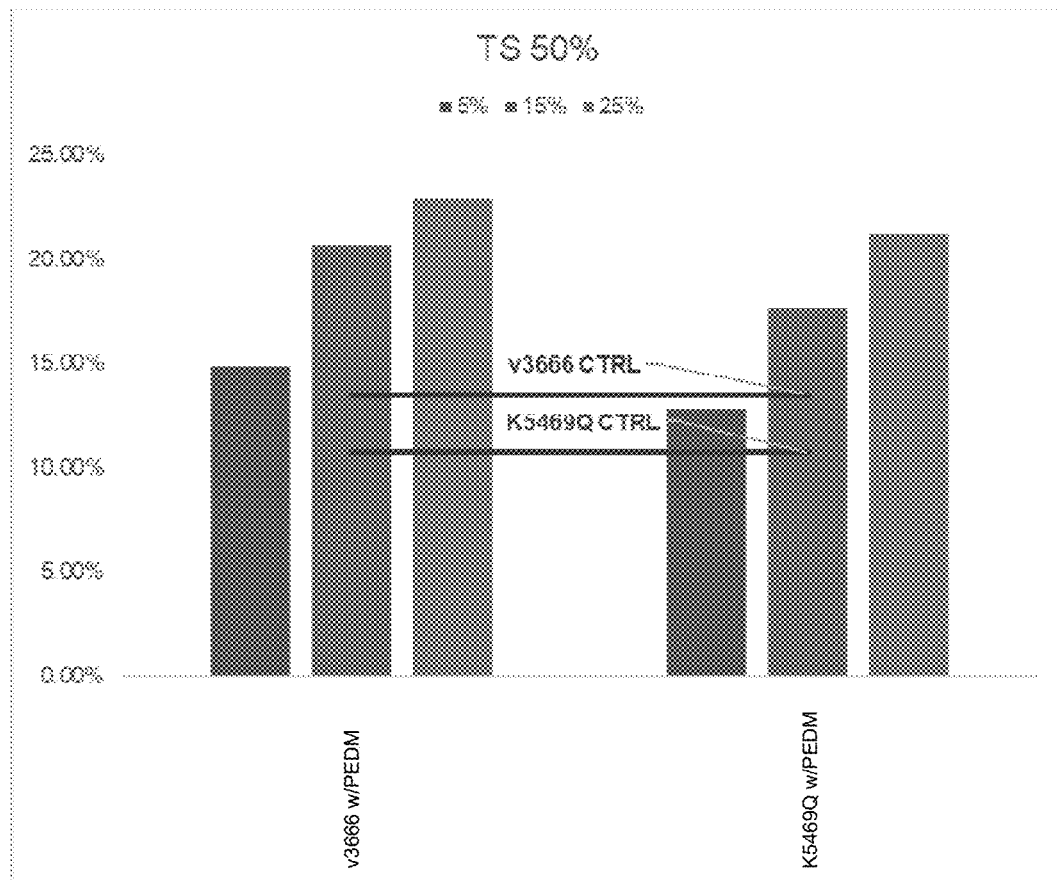
Figure 6A:
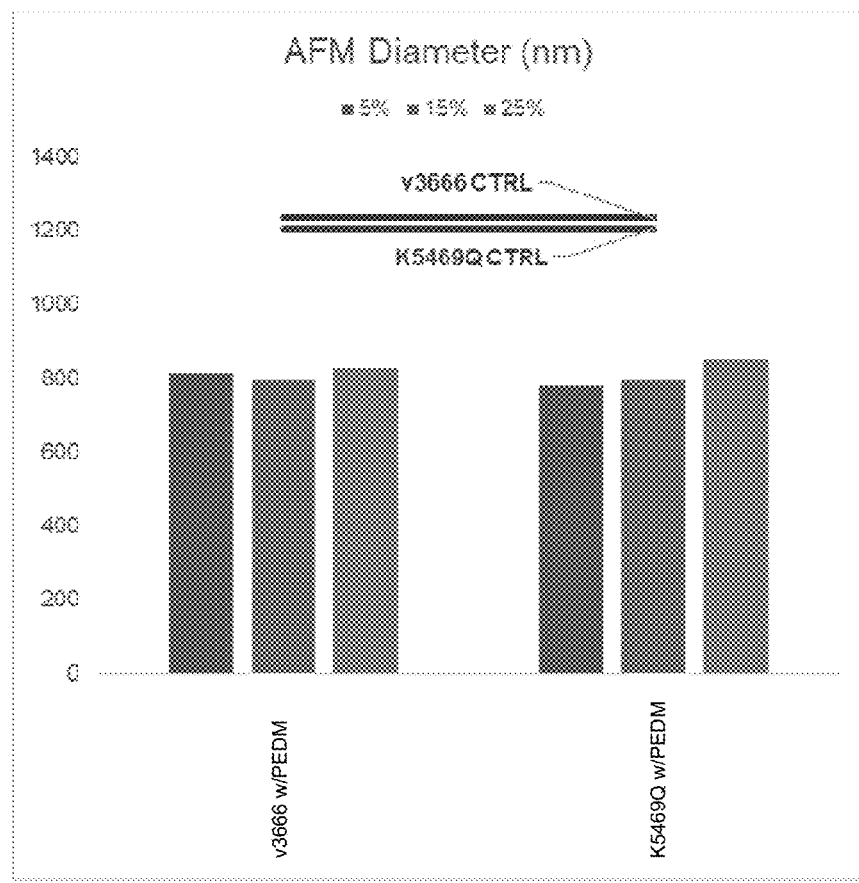
FIGS. 6A-6B show diameter of the rubber particles and the dispersity in the particle size for the inventive samples, respectively.
Figure 6B:
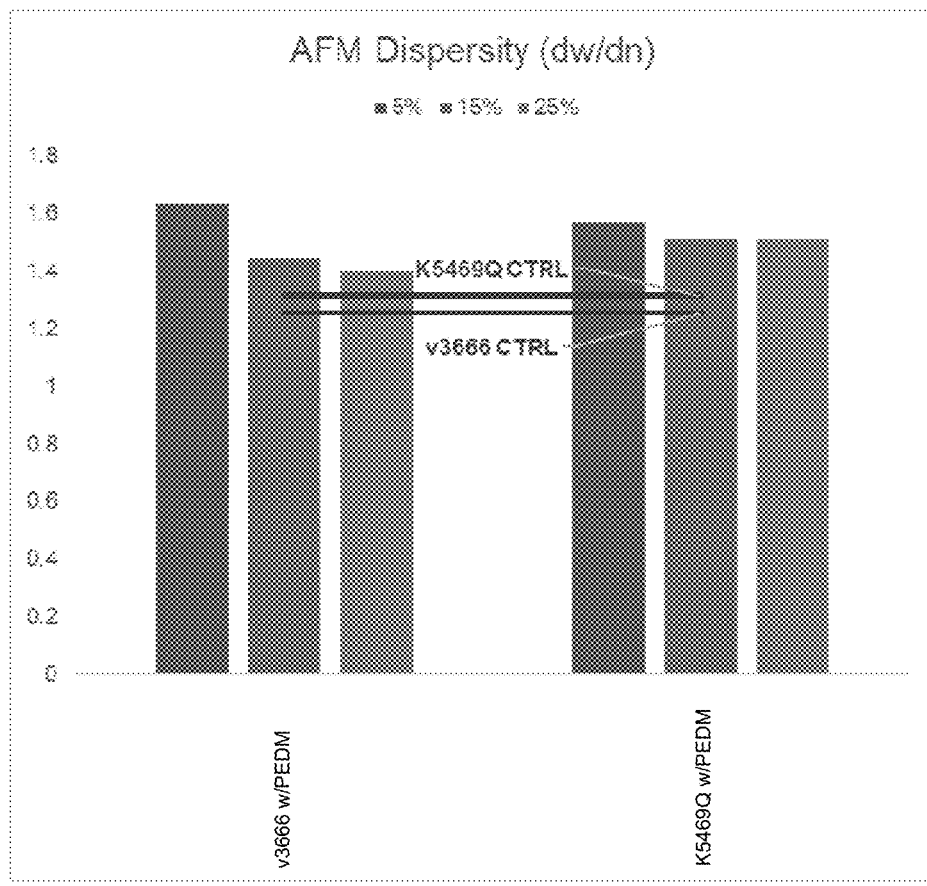
Figure 7A:
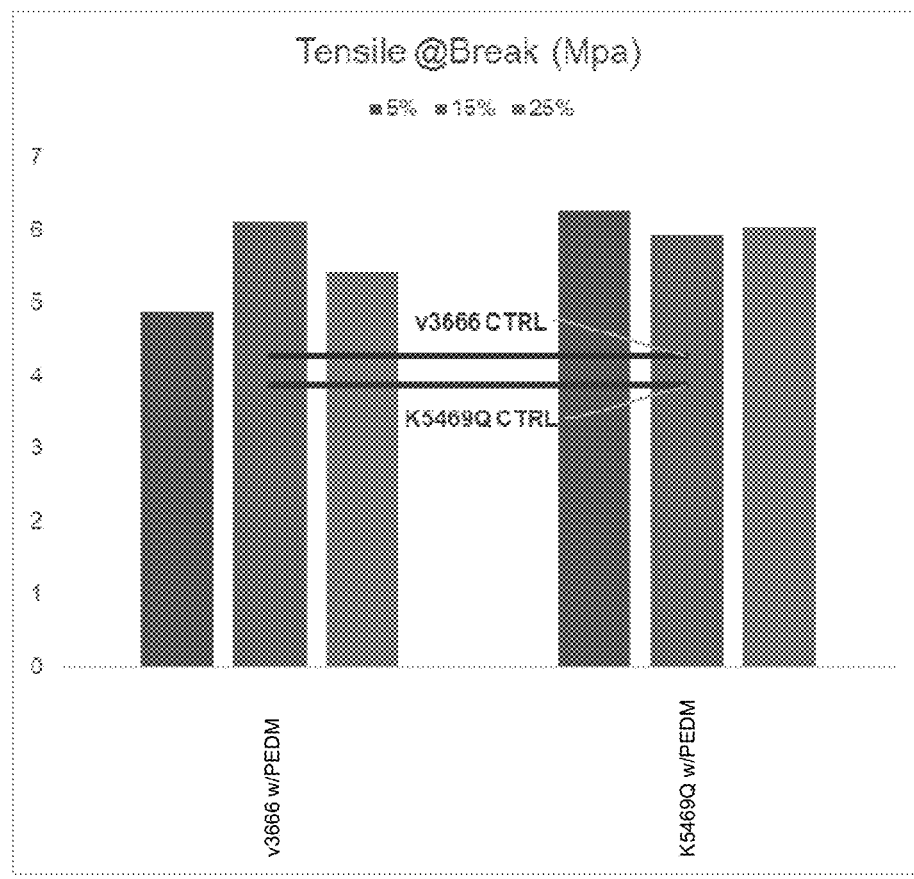
FIGS. 7A-7B show tensile strength and the elongation of the TPV for the inventive samples, respectively.
Figure 7B:
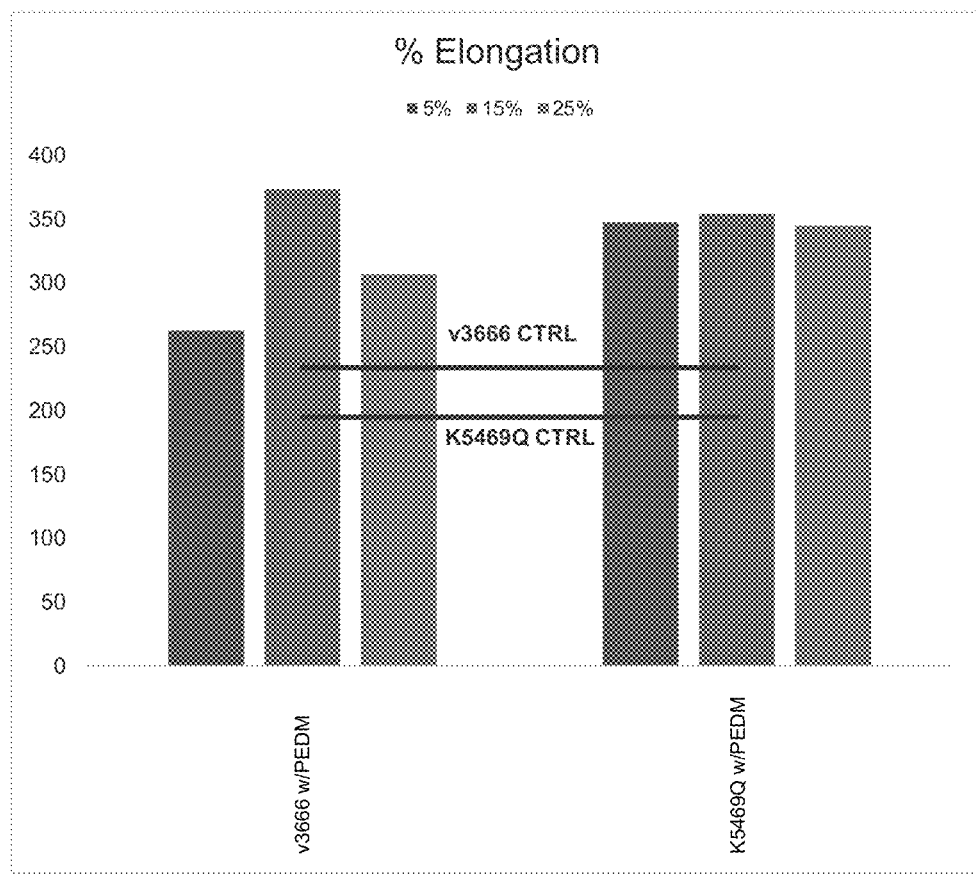

For further information please refer to FIG. 3 of U.S. Ser. No. 16/356,826, filed concurrently herewith, entitled "Compatibilized Thermoplastic Vulcanizate Compositions", claims priority to and the benefit of U.S. Ser. No. 62/653,734 filed Apr. 6, 2018, which is incorporated by reference in its entirety, which is a process flow diagram for preparing TPV blends, at arrows 21, the basic ingredients of a TPV formulation (rubber component a, thermoplastic component "b", oil "c", compatibilizer "d" are introduced into a mixer and mixed to form a TPV formulation (i.e., an unvulcanized TPV composition) 23, which is subjected to further mixing at step 25 for a period of time. One or more curatives, or a curative composition comprising a vulcanizing agent and one or more curing accelerators "e" are mixed with the TPV formulation to form a reacting TPV formulation 27, which is subjected to further mixing 29. Further processing oil "f" is added to the partially or completely vulcanized composition 31 and mixing is continued to form a final TPV composition 35, which is then recovered and optionally can be further processed 37, e.g., by cooling and pelleting, or extrusion to form a slab or other shape 39.

Embodiments

Embodiment 1: A thermoplastic vulcanizate comprising an isotactic polypropylene matrix phase in which cross-linked rubber particles are dispersed, the thermoplastic vulcanizate comprising the reaction product of a mixture comprising:
(a) at least 10 wt % of isotactic polypropylene;
(b) at least 25 wt % of an ethylene-propylene-diene terpolymer (EPDM) containing at least 40 wt % of ethylene-derived units;
(c) at least 0.5 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g; and
(d) at least 0.015 wt % of at least one curative,
wherein the percentages of components (a) to (d) are based on the total weight of the mixture, preferably the ratio of PEDM to EPDM is less than 1.

Embodiment 2: The thermoplastic vulcanizate of embodiment 1, wherein the PEDM comprises 5 to 18 wt % of ethylene-derived units.

Embodiment 3: The thermoplastic vulcanizate of embodiment 1 or 2, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

Embodiment 4: The thermoplastic vulcanizate of any one of embodiments 1 to 3, wherein the PEDM has a Mooney viscosity of MST (5+4) at 230° C. from 10 to 90.

Embodiment 5: The thermoplastic vulcanizate of any one of embodiments 1 to 4, wherein the amount of PEDM is from 2 to 30 wt % of the amount of EPDM.

Embodiment 6: The thermoplastic vulcanizate of any one of embodiments 1 to 5, wherein the particle size dispersity index (PSDI) of the rubber particles is less than 3.

Embodiment 7: The thermoplastic vulcanizate of any one of embodiments 1 to 5 further comprising at least 5 wt % of a diluent based on the total weight of the mixture.

Embodiment 8: A thermoplastic vulcanizate comprising an isotactic polypropylene matrix phase in which cross-linked rubber particles are dispersed, the thermoplastic vulcanizate comprising the reaction product of a mixture comprising:
(a) 20 to 30 wt % of isotactic polypropylene (iPP);
(b) 35 to 55 wt % of an ethylene-propylene-diene terpolymer (EPDM) containing at least 40 wt % of ethylene-derived units;
(c) 0.5 to 15 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g;
(d) 5 to 25 wt % of a diluent; and
(e) 0.015 to 0.03 wt % of at least one curative;
wherein the percentages of components (a) to (e) are based on the total weight of the mixture.

Embodiment 9: The thermoplastic vulcanizate of embodiment 8, wherein the PEDM comprises 5 to 18 wt % of ethylene-derived units.

Embodiment 10: The thermoplastic vulcanizate of embodiment 8 or 9, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

Embodiment 11. The thermoplastic vulcanizate of any one of embodiments 8 to 10, wherein the PEDM has a Mooney viscosity of MST (5+4) @230C from 10 to 90.

Embodiment 12: The thermoplastic vulcanizate of any one of embodiments 8 to 11, in which the amount of PEDM is from 2 to 30 wt % of the amount of EPDM Embodiment 13: The thermoplastic vulcanizate of any one of embodiments 8 to 12, wherein the particle size dispersity index (PSDI) of the rubber particles is less than 3.

Embodiment 14: A process for producing a thermoplastic vulcanizate (TPV) comprising:
i) providing a mixture comprising:
(a) at least 10 wt % of isotactic polypropylene;
(b) at least 25 wt % of an ethylene-propylene-diene terpolymer (EPDM) containing at least 50 wt % of ethylene-derived units;
(c) at least 0.5 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g;
(d) at least 5 wt % of a diluent; and
(e) at least 0.015 wt % of at least one curative,
wherein the percentages of components (a) to (e) are based on the total weight of the mixture, and
(ii) reacting the mixture under shear and at a temperature above the melting point of the polypropylene to at least partially cross-link the EPDM and PEDM and produce a polypropylene matrix phase in which cross-linked rubber particles are dispersed.

Embodiment 15: The process of embodiment 14, wherein the reacting (ii) is performed in a twin-screw extruder.

Test Methods

In addition to the test methods reported in the preceding discussion, the following test methods were used to generate the data presented in the Examples.

Z-average, weight-average and number average molecular weights, Mz, Mw, and Mn, can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M (Mw, Mn, Mz) can be computed from known expressions. The desired MWD function (e.g., Mw/Mn or Mz/Mw) is the ratio of the corresponding M values. Measurement of M and MWD are well known in the art and are discussed in more detail in, for example, Slade, P. E. Ed., Polymer Molecular Weights Part II, Marcel Dekker, Inc., N.Y., (1975) 287-368; Rodriguez, F., Principles of Polymer Systems 3rd Ed., Hemisphere Pub. Corp., N.Y., (1989) 155-160; U.S. Pat. No. 4,540,753; Ver Strate et al., Macromolecules, Vol. 21, (1988) pp. 3360-3371, each of which is incorporated herein by reference.

Tension set was determined according to ASTM D-412 Method A using a dumbbell shaped die cut sample at room temperature. 25% and 50% extension of the sample was used with the elongation and relaxation times as specified with elongation spped of 50 mm/min being used.

Shore A hardness: The determination of the Shore A hardness is according to ASTM D 2240. In this version of the method a portion of the sample is tested at room temperature. The data is recorded 15 seconds after the indentation is created in the sample.

Particle size: All TPV samples, including controls (Examples 1 and 2), were cryo-faced using a cryo-microtom (Leica) and examined afterward by a tapping phase AFM (atomic force microscopy, Icon, Bruker). For each sample, three 60 by 60 micron² phase images were collected and then processed by SPIP software (scanning probe image processing, Image Metrology). Particle count is the number of dispersion particles measured in images and Dn, Dw, and Dv are equivalent dispersion diameters of number average, weight average, and volume average, respectively. Dw/Dn is the "particle size dispersity index", or PSDI, and is a measure of the size dispersity. The area percent is the percentage of area occupied by these vulcanized rubber particles.

Tensile strength, % strain and stress strain values were obtained from samples tested according to ASTM D638, except that the separation of the grips was conducted at 50.8 cm/min (20 in/min). The extension of the grips and thus the samples was independently determined using an extensometer attached to the testing apparatus. The tensile strength data were reported in engineering units (MPa or psi), and the elongation was reported as the % elongation of the distension zone of the sample.

Hysteresis Energy median is determined us the hysteresis method described at U.S. 9,938,400, Column 31, line 63 to column 32, line 44.

Dynamic Mechanical Thermal Analysis (DMTA): Dynamic mechanical thermal analysis (DMTA). This test provides information about the small-strain mechanical response (relaxation behavior) of a sample as a function of temperature over a temperature range that includes the glass transition region and the visco-elastic region prior to melting.

Typically, samples were tested using a three point bending configuration (TA Instruments DMA 2980). A solid rectangular compression molded bar was placed on two fixed supports; a movable clamp applied a periodic deformation to the sample midpoint at a frequency of 1 Hz and amplitude of 20 µm. The sample was initially cooled to −130° C. then heated to 60° C. at a heating rate of 3° C./min. In some cases, compression molded bars were tested using other deformation configurations, namely dual cantilever bending and tensile elongation (Rheometrics RSAII). The periodic deformation under these configurations was applied at a frequency of 1 Hz and strain amplitude of 0.05%. The sample was cooled to −130° C. and then heated to 60° C. at a rate of 2° C./min. The slightly difference in heating rate does not influence the glass transition temperature measurements significantly.

EXAMPLES

The following Examples are presented for illustrative purposes and not intended to limit the scope of the present disclosure.

Examples 1 and 2 (Comparative)

In Example 1, a first comparative TPV composition was produced from the following starting materials: V3666™ EPDM (oil extended with 75 phr oil, 64% ethylene, 4.5% ENB, 52 Mooney, ExxonMobell Chemical Company), Keltan™ 597Q EPDM (oil extended with 100 phr oil, 62% ethylene, 4.0% ENB, 55 Mooney, Arlanxeo Company), PP5341™ Polypropylene-isotactic polypropylene (0.8 MFR, ExxonMobil Chemical Company), clay (Icecap-K™), AMP™ 49974 (Carbon Black Masterbatch from Apacet and oil (Paramount 6001R™). Curatives employed for vulcanization included phenolic resin in oil, stannous chloride, $SnCl_2$, and zinc oxide, ZnO. The RIO (phenolic resin in oil) composition is HRJ16261™ (Schnectady Chemical Inc., SI Group,) in Paralux™ 6001R oil.

In Example 2, a second comparative TPV composition was produced from the same starting materials as Example 1 but with the V3666™ EPDM being replaced by Keltan™ 597Q EPDM (oil extended with 100 phr oil, 62% ethylene, 4.0% ENB, 55 Mooney, Arlanxeo).

No PEDM was included in the TPV mixtures of Examples 1 and 2.

The TPVs were prepared in a Brabender internal mixer running at 180° C. (356° F.) and 100 RPM. EPDM and PP were added at the beginning, after 1 minute, ½ of the oil was added, then after 2 min, the RIO was introduced, mixed for 1 min and $SnCl_2$/ZnO was added, mixed for another 5 min, finally the other ½ of oil was added and mixed for 3 minutes. The total mix time was 12 minutes.

The composition and properties of the resultant TPVs are summarized in Table 1.

TABLE 1

| Sample | Example 1 | Example 2 |
| --- | --- | --- |
| Formula (grams) | | |
| V3666 ™ EPDM with 75 phr oil extension | 29.96 | |
| Keltan ™ 597Q EPDM with 100 phr oil extension | | 34.24 |
| PP5341 | 4.46 | 4.46 |
| AMP 49974 (CB MB) | 4.10 | 4.10 |
| Icecap K (Clay) | 7.19 | 7.19 |
| ZnO | 0.26 | 0.26 |
| Paramount 6001R (pre) | 2.24 | |
| RIO HRJ16261 (Paralux 6001R) | 2.59 | 2.59 |
| $SnCl_2$ MB | 0.57 | 0.57 |
| Paramount 6001R (post) | 8.63 | 6.60 |
| Total | 60.00 | 60.00 |
| Properties | | |
| 25% Tension Set | 7.50% | 5.67% |
| 50% Tension Set | 13.50% | 10.75% |

TABLE 1-continued

| Sample | Example 1 | Example 2 |
|---|---|---|
| Morphology | | |
| dn | 1234 | 1206 |
| dw | 1547 | 1582 |
| Dv | 1806 | 1979 |
| dw/dn | 1.25 | 1.31 |
| dv/dw | 1.17 | 1.25 |
| Mechanicals | | |
| DMTA | figure | figure |
| Tensile (median) | 4.26 | 3.87 |
| % Strain (med) | 233.55 | 194.92 |
| Shore A Hardness (med) | 52.7 | 53.7 |
| Hysteresis | | |
| Energy (inside black loop) Median | 0.56475 | 0.582605 |
| Energy (inside red loop) Median | 0.40372 | 0.421115 |

Prior to use in producing TPVs, the resultant PEDM was combined with 866 ppmw of Irganox 1076 as an antioxidant. The resultant mixture is designated PEDM1 in the ensuing discussion.

In Examples 3 to 5, TPVs were produced using the ingredients and method of Example 1 but with part of the V3666 EPDM being replaced with PEDM1, such that the PEDM1 comprised 5 wt %, 15 wt % and 25 wt % respectively of the total amount of EPDM and PEDM1 in the TPV.

In Examples 6 to 8, TPVs were produced using the ingredients and method of Example 2 but with EPDM being Keltan 5469Q and part of the EPDM being replaced with PEDM1, such that the PEDM1 comprised 5 wt %, 15 wt % and 25 wt % respectively of the total amount of EPDM and PEDM1 in the TPV.

The composition and properties of the resultant TPVs are summarized in Table 2.

TABLE 2

| Sample | Example 3 | Example 4 | Example 5 | Example 6 | Example 7 | Example 8 |
|---|---|---|---|---|---|---|
| Formula (grams) | | | | | | |
| V3666 ™ (EPDM 2/6001R Oil Extension) | 28.46 | 25.46 | 22.47 | | | |
| Keltan ™ 5469Q | | | | 32.53 | 29.10 | 25.68 |
| PEDM1 | 0.86 | 2.57 | 4.28 | 0.86 | 2.57 | 4.28 |
| PP5341 ™ | 4.46 | 4.46 | 4.46 | 4.46 | 4.46 | 4.46 |
| AMP 49974 ™ (carbon black masterbatch) | 4.10 | 4.10 | 4.10 | 4.10 | 4.10 | 4.10 |
| Icecap ™ K (Clay) | 7.19 | 7.19 | 7.19 | 7.19 | 7.19 | 7.19 |
| ZnO | 0.26 | 0.26 | 0.26 | 0.26 | 0.26 | 0.26 |
| Paramount ™ 6001R (pre) | 2.88 | 4.17 | 5.45 | | | |
| RIO HRJ16261 (Paralux ™ 6001R) | 2.59 | 2.59 | 2.59 | 2.59 | 2.59 | 2.59 |
| SnCl2 MB | 0.57 | 0.57 | 0.57 | 0.57 | 0.57 | 0.57 |
| Paramount ™ 6001R (post) | 8.63 | 8.63 | 8.63 | 7.45 | 9.16 | 10.87 |
| 25% Tension Set | 7.17% | 9.50% | 9.67% | 6.83% | 8.50% | 8.83% |
| 50% Tension Set | 14.83% | 20.67% | 22.83% | 12.83% | 17.67% | 21.17% |
| dn | 815 | 796 | 829 | 780 | 796 | 851 |
| dw | 1331 | 1149 | 1158 | 1225 | 1204 | 1284 |
| Dv | 2112 | 1589 | 1552 | 1833 | 1738 | 1829 |
| dw/dn | 1.63 | 1.44 | 1.40 | 1.57 | 1.51 | 1.51 |
| dv/dw | 1.59 | 1.38 | 1.34 | 1.50 | 1.44 | 1.42 |
| DMTA | | | | | | |
| Tensile (med) | 4.87 | 6.1 | 5.41 | 6.28 | 5.93 | 6.04 |
| % Strain (med) | 262.73 | 373.06 | 306.95 | 347.46 | 354.36 | 344.7 |
| Shore A Hardness (med) | 54.8 | 57.6 | 59 | 55.8 | 59 | 60 |
| Energy (inside black loop) Median | 0.66882 | 0.68393 | 0.75325 | 0.66138 | 0.7002 | 0.76684 |
| Energy (inside red loop) Median | 0.42473 | 0.41235 | 0.43704 | 0.43746 | 0.43219 | 0.45698 |

Examples 3 to 8

PEDM Synthesis

A PEDM elastomer containing 11.4 wt % ethylene, 2.3 wt % ethylene-norbornene (ENB) and the remainder propylene was produced according to the process described in U.S. Pat. No. 7,605,217, the entire contents of which are incorporated herein by reference. The catalyst employed was dimethylsilylindenyl dimethyl hafnium activated with dimethylanilinium tetrakis (heptafluoronaphthyl) borate. The PEDM had a heat of fusion of less than 10 J/g, a Mn of 143,000, a Mw of 252,000, and a Mz of 418,000.

While the present disclosure has been described and illustrated by reference to particular embodiments, those of ordinary skill in the art will appreciate that the disclosure lends itself to variations not necessarily illustrated herein. For this reason, then, reference should be made solely to the appended claims for purposes of determining the scope of the present disclosure. Further, the term "comprising" is considered synonymous with the term "including". Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

The invention claimed is:

1. A thermoplastic vulcanizate comprising an isotactic polypropylene matrix phase in which cross-linked rubber particles are dispersed, the thermoplastic vulcanizate comprising the reaction product of a mixture comprising:
   (a) at least 10 wt % of isotactic polypropylene;
   (b) at least 25 wt % of an ethylene-propylene-diene terpolymer (EPDM) containing at least 40 wt % of ethylene-derived units;
   (c) at least 0.5 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g; and
   (d) at least 0.015 wt % of at least one curative,
   wherein the percentages of components (a) to (d) are based on the total weight of the mixture.

2. The thermoplastic vulcanizate of claim 1, wherein the PEDM comprises 5 to 18 wt % of ethylene-derived units.

3. The thermoplastic vulcanizate of claim 1, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

4. The thermoplastic vulcanizate of claim 1, wherein the PEDM has a Mooney viscosity of MST (5+4) at 230° C. from 10 to 90.

5. The thermoplastic vulcanizate of claim 1, in which the amount of PEDM is from 2 to 30 wt % of the amount of EPDM.

6. The thermoplastic vulcanizate of claim 1, wherein the particle size dispersity index (PSDI) of the rubber particles is less than 3.

7. The thermoplastic vulcanizate of claim 1 and further comprising at least 5 wt % of a diluent based on the total weight of the mixture.

8. A thermoplastic vulcanizate comprising an isotactic polypropylene matrix phase in which cross-linked rubber particles are dispersed, the thermoplastic vulcanizate comprising the reaction product of a mixture comprising:
   a) 20 to 30 wt % of isotactic polypropylene (iPP);
   b) 35 to 55 wt % of an ethylene-propylene-diene terpolymer (EPDM) containing at least 40 wt % of ethylene-derived units;
   c) 0.5 to 15 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g;
   d) 5 to 25 wt % of a diluent; and
   e) 0.015 to 0.03 wt % of at least one curative;
   wherein the percentages of components (a) to (e) are based on the total weight of the mixture.

9. The thermoplastic vulcanizate of claim 8, wherein the PEDM comprises 5 to 18 wt % of ethylene-derived units.

10. The thermoplastic vulcanizate of claim 8, wherein the PEDM comprises 0.3 to 10 wt % of diene-derived units; where the diene is selected from the group consisting of 5-ethylidene-2-norbornene, 5-vinyl-2-norbornene, divinyl benzene, and dicyclopentadiene.

11. The thermoplastic vulcanizate of claim 8, wherein the PEDM has a Mooney viscosity of MST (5+4) at 230° C. from 10 to 90.

12. The thermoplastic vulcanizate of claim 8, in which the amount of PEDM is from 2 to 30 wt % of the amount of EPDM.

13. The thermoplastic vulcanizate of claim 8, wherein the particle size dispersity index (PSDI) of the rubber particles is less than 3.

14. A process for producing a thermoplastic vulcanizate (TPV) comprising:
   i) providing a mixture comprising:
      (a) at least 10 wt % of isotactic polypropylene;
      (b) at least 25 wt % of an ethylene-propylene-diene terpolymer (EPDM) containing at least 50 wt % of ethylene-derived units;
      (c) at least 0.5 wt % of a propylene-ethylene-diene terpolymer (PEDM) containing at least 60 wt % propylene-derived units and less than or equal to 25 wt % of ethylene-derived units and having a heat of fusion ($H_f$) of 2 to 10 J/g;
      (d) at least 5 wt % of a diluent; and
      (e) at least 0.015 wt % of at least one curative,
      wherein the percentages of components (a) to (e) are based on the total weight of the mixture, and
   (ii) reacting the mixture under shear and at a temperature above the melting point of the polypropylene to at least partially cross-link the EPDM and PEDM and produce a polypropylene matrix phase in which cross-linked rubber particles are dispersed.

15. The process of claim 14, wherein the reacting (ii) is performed in a twin-screw extruder.

* * * * *